US006809489B1

(12) United States Patent
Yoshida et al.

(10) Patent No.: US 6,809,489 B1
(45) Date of Patent: Oct. 26, 2004

(54) PRINT CONTROL UNIT AND PRINT CONTROL METHOD, AND STORAGE MEDIUM STORING PRINT CONTROL PROGRAM

(75) Inventors: Masanori Yoshida, Nagano-ken (JP); Hitoshi Igarashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 827 days.

(21) Appl. No.: 09/665,522

(22) Filed: Sep. 19, 2000

(30) Foreign Application Priority Data

Sep. 24, 1999 (JP) .......................................... 11-270717
Aug. 7, 2000 (JP) ....................................... 2000-238271

(51) Int. Cl.[7] ......................... G05B 11/01; G05B 19/10; G05B 19/40; G05B 1/06

(52) U.S. Cl. ....................... 318/560; 318/567; 318/652; 318/685; 318/603; 700/13; 700/14; 700/46; 700/57; 700/63; 700/69; 700/78

(58) Field of Search ................................ 318/560, 567, 318/652, 685, 696, 432, 434, 603; 700/13, 14, 46, 57, 63, 69, 78

(56) References Cited

U.S. PATENT DOCUMENTS 5,210,562 A * 5/1993 Miyazawa et al. ............ 396/49
5,264,769 A * 11/1993 Itoh ........................... 318/685
5,416,395 A * 5/1995 Hiramatsu et al. .......... 318/600
5,748,206 A 5/1998 Yamane
5,871,291 A 2/1999 Kawazoe
6,310,459 B1 * 10/2001 Kurashina ................... 318/685
6,538,407 B2 * 3/2003 Tanaka ....................... 318/445
6,600,286 B2 * 7/2003 Tanaka et al. ............. 318/560
6,603,282 B2 * 8/2003 Kurashina ................... 318/685

FOREIGN PATENT DOCUMENTS

JP 02-078557 3/1990
JP 09-277643 10/1997
JP 11-184528 7/1999

* cited by examiner

*Primary Examiner*—Bentsu Ro
*Assistant Examiner*—Patrick Miller
(74) *Attorney, Agent, or Firm*—Sughrue Mion, PLLC

(57) ABSTRACT

There is provided a print control unit capable of transferring and stopping an object to be controlled at a target position when unexpected load is applied to the object. A print control unit includes: a selection control part, operating at a predetermined timing, to select and set the control parameters in accordance with the target speed, to judge as to whether the object is located within a target range, based on the output of the position detecting part, if located, the selection control part selecting and operating the third control part, while if the object is not located within the target range, the selection control part selecting and operating the first or the second control part based on the physical value corresponding to the speed.

19 Claims, 18 Drawing Sheets

| SPEED | TARGET SPEED [cps] | OPERATION | TIMER [μs] | T_limitL [μs] | T_limit [μs] | T_limitD [μs] | I_step1 [mA] | I_step2 [mA] | I_step3 [mA] | I_hold [mA] | I_start [mA] | I_max [mA] |
|---|---|---|---|---|---|---|---|---|---|---|---|---|
| CREEP-ING | $a_{v1}$ | LOGICAL SEEK | $b_{Tm1}$ | $b_{TL1}$ | $b_{T1}$ | $b_{TD1}$ | $c_{11}$ | $c_{21}$ | $c_{31}$ | $c_{f1}$ | $c_{s1}$ | $c_{m1}$ |
| NORMAL | $a_{v2}$ | RUBBING | $b_{Tm2}$ | $b_{TL2}$ | $b_{T2}$ | $b_{TD2}$ | $c_{12}$ | $c_{22}$ | $c_{32}$ | $c_{f2}$ | $c_{s2}$ | $c_{m2}$ |
| HIGH | $a_{v3}$ | WIPING | $b_{Tm3}$ | $b_{TL3}$ | $b_{T3}$ | $b_{TD3}$ | $c_{13}$ | $c_{23}$ | $c_{33}$ | $c_{f3}$ | $c_{s3}$ | $c_{m3}$ |

FIG. 9

PRINT CONTROL UNIT AND PRINT CONTROL METHOD, AND STORAGE MEDIUM STORING PRINT CONTROL PROGRAM

BACKGROUND OF THE INVENTION

1. Field of the Invention

The present invention relates to a print control unit and a print control method, and a storage medium storing a print control program. More specifically, the invention is related to a control of transferring a carriage to a target position and stop it there against unexpected load. This control is called load-applied positioning control hereinafter.

2. Description of Related Art

In a typical serial printer such as an ink jet printer, a recording head scans on a printing paper to print. This recording head is fixed to a carriage to move with the carriage. This carriage is driven by a DC(Direct Current) motor.

A control of the carriage from a stop position to a target position is a PID control based on a speed deviation of a detected speed from a target speed calculated based on a positional deviation of a detected position of the carriage from the target position.

Unexpected load is sometimes applied to a carriage of a printing apparatus during carriage transfer, ink replenishment at a target position, and so on. This causes stoppage of the carriage during the transfer or stoppage at a position apart from the target position. A DC motor is driven by PID control, for example, to transfer the carriage to the target position.

A conventional PID control of transferring a carriage from a stop position to a target position is, however, not designed to accept a heavy load to be applied to a the carriage (an object to be controlled), thus being not able to transfer the carriage to the target position.

Continuous carriage stoppage is a harder task for PID control even if it is possible to transfer the carriage to the target position.

SUMMARY OF THE INVENTION

It is therefore an object of the present invention to eliminate the aforementioned problems and to provide a control unit and a print control method and also a storage medium storing print control program, capable of transferring and stopping an object to be controlled at a target position even when unexpected load is applied to the object.

In order to accomplish the aforementioned and other objects, according to one aspect of the present invention, there is provided a print control unit including: a position detecting part to detect a position and a transfer direction of an object to be controlled and driven by a motor; a speed detecting part to detect at least a physical value that corresponds to a speed of the object; a first control part to decide a current value to be supplied to the motor so that the speed of the object reaches a target speed, based on the output of the position detecting part and at least one of control parameters, thus controlling the motor based on the current value decided by the first control part; a second control part to decide a current value to be supplied to the motor so that the speed of the object reaches the target speed, based on the outputs of the position detecting part and the speed detecting part, and at least one of the control parameters, thus controlling the motor based on the current value decided by the second control part; a third control part to decide a current value to be supplied to the motor so that the object stops within a predetermined range, based on the output of the position detecting part and at least one of the control parameters, thus controlling the motor based on the decided current value; and a selection control part, operating at a predetermined timing, to select and set the control parameters in accordance with the target speed, to judge as to whether the object is located within a target range, based on the output of the position detecting part, if located, the selection control part selecting and operating the third control part, while if the object is not located within the target range, the selection control part selecting and operating the first or the second control part based on the physical value corresponding to the speed.

The print control unit as constructed above according to the present invention achieves object transfer and stoppage at a target position even when unexpected load is applied to an object to be controlled.

Moreover, the present invention provides a print control method used for a print control unit including a position counter having a counter that detects leading and trailing edges of output pulses of an encoder that is transferred with a carriage driven by a carriage motor, and counts up the detected edges while the carriage motor is rotating in a normal direction, on the other hand, counts down the detected edges while the carriage motor is rotating in a reverse direction, thus the position counter generating pulses in synchronism with the leading and trailing edges; a period counter to detect the leading and trailing edges of the output pulses of the encoder, and measure a period between the edges; and a timer counter having a set value corresponding to the target speed of the carriage, a counted value of the timer counter being reset when the counted value has reached a set value or when the timer counter receives the pulses from the position counter, the method including the steps of: supplying an initial current value to the carriage motor; comparing the counted value of the position counter and the target position of the carriage when the timer counter receives the pulses from the position counter or when the counted value of the timer counter reaches the set value; performing hold control so that the carriage is stopped within an allowable range including a target range based on the output of the position counter and at least one of control parameters when the position of the carriage is located within the target range including the target position; performing timer interruption control so that a speed of the carriage reaches the target speed based on the output of the position counter and the control parameter when the position of the carriage is not located within the target range and when the timer counter receives no pulses from the position counter even the counted value of the timer counter has reached the set value; and performing encoder interruption control so that the speed of the carriage reaches the target speed based on the outputs of the position counter and the period counter and also the control parameter when the position of the carriage is not located within the target range and when the timer counter receives pulses from the position counter until the counted value of the timer counter reaches set value.

The print control method as described above according to the present invention achieves object transfer and stoppage at a target position even when unexpected load is applied to an object to be controlled.

Furthermore, the present invention provides a computer-readable storage medium storing control program code for controlling a print control unit, including: first program code means for supplying an initial current value to a carriage motor for driving a carriage; second program code means for comparing a counted value of a position counter and a target position of the carriage when a timer counter receives pulses from the position counter or when the counted value of the timer counter reaches the set value; third program code means for performing hold control so that the carriage is stopped within an allowable range including a target range based on the output of the position counter and at least one of control parameters when the position of the carriage is located within the target range including the target position; forth program code means for performing timer interruption control so that a speed of the carriage reaches the target speed based on the output of the position counter and the control parameter when the position of the carriage is not located within the target range and when the timer counter receives no pulses from the position counter even the counted value of the timer counter has reached the set value; and fifth program code means for performing encoder interruption control so that the speed of the carriage reaches the target speed based on the outputs of the position counter and the period counter and also the control parameter when the position of the carriage is not located within the target range and when the timer counter receives pulses from the position counter until the counted value of the timer counter reaches set value.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 9 shows a Table listing control parameters used in the present invention;

DESCRIPTION OF THE PREFERRED EMBODIMENTS

Referring now to the accompanying drawings, the preferred embodiments of the present invention will be described below.

Figure 11:
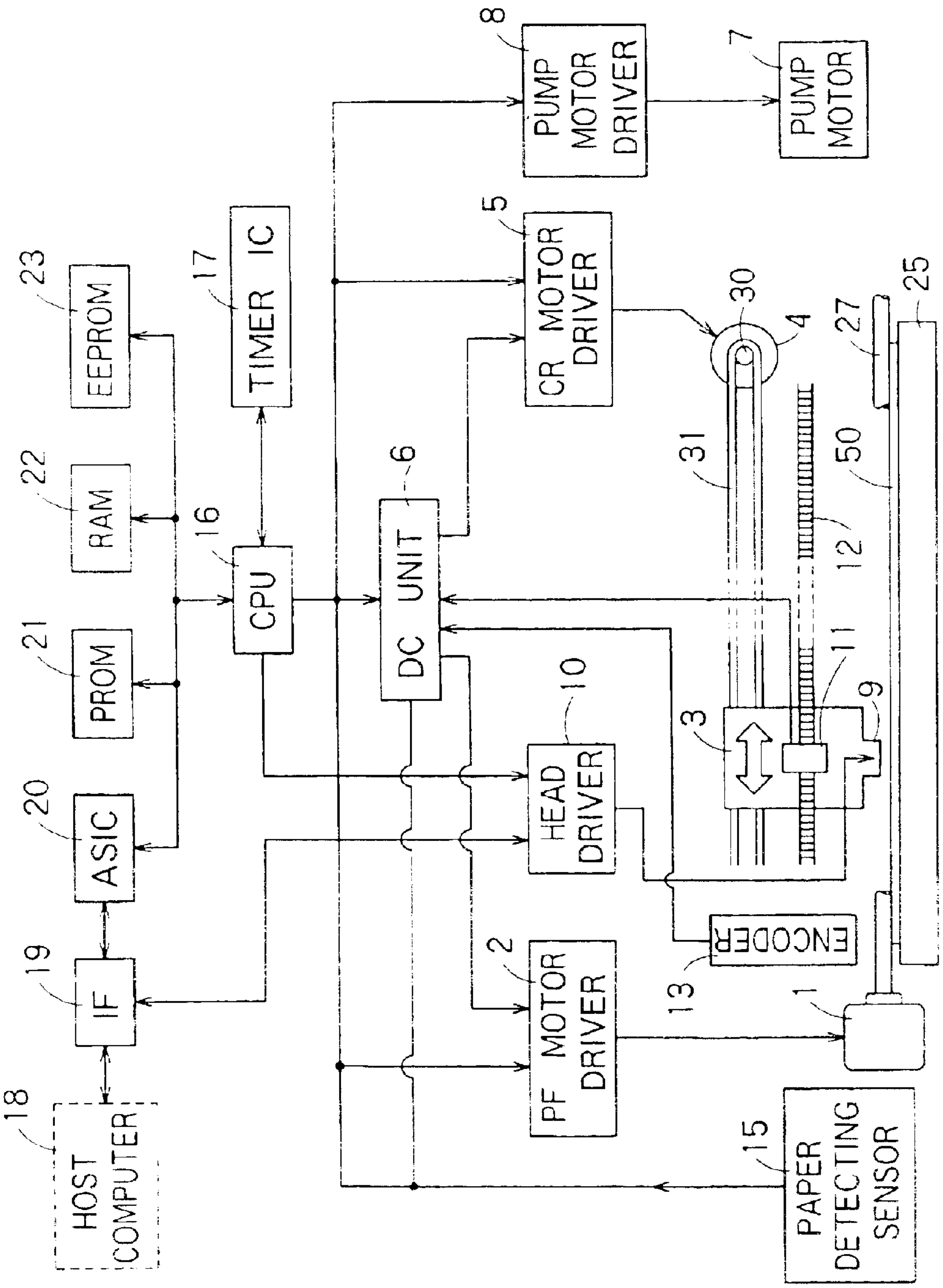
FIG. 11 is a block diagram schematically showing the construction of an ink jet printer for which a print control unit according to the present invention is used.

First, the schematic construction and control of an ink jet printer, which uses a control unit for controlling a motor for use in a printer according to the present invention, will be described. The schematic construction of this ink jet printer is shown in FIG. 11.

This ink jet printer comprises: a paper feed motor (which will be also hereinafter referred to as a PF motor) 1 for feeding a paper; a paper feed motor driver 2 for driving the paper feed motor 1; a carriage 3; a carriage motor (which will be also hereinafter referred to as a CR motor) 4; a CR motor driver 5 for driving the carriage motor 4; a DC unit 6; a pump motor 7 for controlling the suction of ink for preventing clogging; a pump motor driver 8 for driving the pump motor 7; a recording head 9, fixed to the carriage 3, for discharging ink to a printing paper 50; a head driver 10 for driving and controlling the recording head 9; a linear type encoder 11 fixed to the carriage 3; a code plate 12 which has slits in regular intervals; a rotary type encoder 13 for use in the PF motor 1; a paper detecting sensor 15 for detecting the position of the rear edge of a paper which is being printed; a CPU 16 for controlling the whole printer; a timer IC 17 for periodically generating an interruption signal to output the signal to the CPU 16; an interface part (which will be also hereinafter referred to as an IF) 19 for transmitting/receiving data to/from a host computer 18; an ASIC 20 for controlling the printing definition, the driving waveform of the recording head 9 and so forth on the basis of printing information which is fed from the host computer 18 via the IF 19; a PROM 21, RAM 22 and EEPROM 23 which are used as working and program storing regions for the ASIC 20 and the CPU 16; a platen 25 for supporting the paper 50 during print; a carrier roller 27, driven by the PF motor 1, for carrying the printing paper 50; a pulley 30 mounted on the rotating shaft of the CR motor 4; and a timing belt 31 driven by the pulley 30.

Furthermore, the DC unit 6 is designed to drive and control the paper feed motor driver 2 and the CR motor driver 5 on the basis of a control command, which is fed from the CPU 16, and the outputs of the encoders 11 and 13. In addition, each of the paper feed motor 1 and the CR motor 4 comprises a DC motor.

Figure 12:
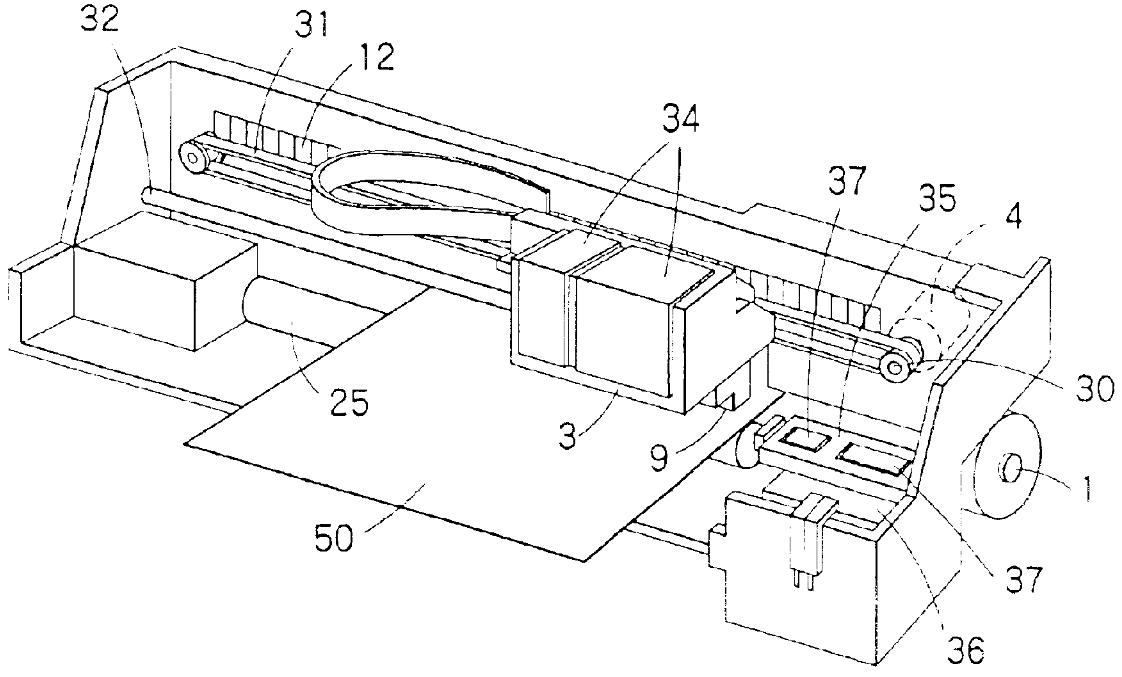
FIG. 12 is a perspective view showing the peripheral construction of a carriage.

The peripheral construction of the carriage 3 of this ink jet printer is shown in FIG. 12.

The carriage 3 is connected to the carriage motor 4 via the timing belt 31 and the pulley 30 to be driven so as to be guided by a guide member 32 to move in parallel to the platen 25. The carriage 3 is provided with the recording head 9 on the surface facing the printing paper. The recording head 9 comprises a nozzle row for discharging a black ink and a nozzle row for discharging color inks. Each nozzle is supplied with ink from an ink cartridge 34, and discharges drops of ink to the printing paper to print characters and/or images.

In a non-print region of the carriage 3, there are provided a capping unit 35 for sealing a nozzle opening of the recording head 9 during non-print, and a pump unit 36 having the pump motor 7 shown in FIG. 11. When the carriage 3 moves from a print region to the non-print region, the carriage 3 contacts a lever (not shown) to move the capping unit 35 upwards to seal the recording head 9.

When the nozzle opening row of the recording head 9 is clogged with ink, or when the cartridge 34 is exchanged or the like to force the recording head 9 to discharge ink, the pump unit 36 is operated in the sealed state of the recording head 9, to suck ink out of the nozzle opening row by a negative pressure from the pump unit 36. Thus, dust and paper powder adhering to a portion near the nozzle opening row are cleaned. Moreover, bubbles of the recording head 9, together with ink, are discharged to a cap 37.

Figure 13:
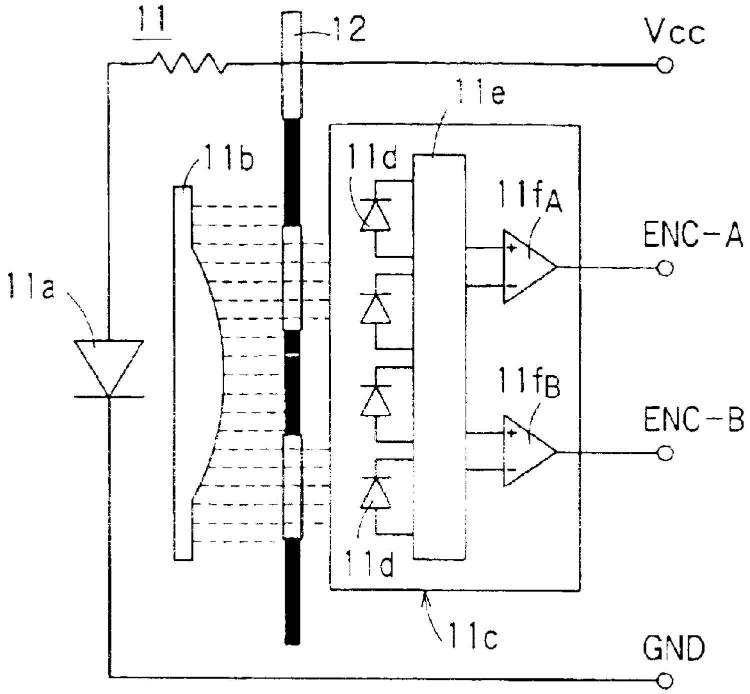
FIG. 13 is a schematic view showing the construction of linear type encoder.

Then, the construction of the linear type encoder 11 mounted on the carriage 3 is shown in FIG. 13. This encoder 11 comprises a light emitting diode 11*a*, a collimator lens 11*b*, and a detection processing part 11*c*. The detection processing part 11*c* has a plurality of (four) photodiodes 11*d*, a signal processing circuit 11*e*, and two comparators $11f_A$ and $11f_B$.

If a voltage Vcc is applied between both ends of the light emitting diode 11*a* via a resistor, light rays are emitted from the light emitting diode 11*a*. The light rays are collimated by the collimator lens 11*b* to pass through the code plate 12. The code plate 12 is provided with slits at regular intervals (e.g., every 1/180 inches (=1/180×2.54 cm)).

The parallel rays passing through the code plate 12 are incident on each of the photodiodes 11*d* via a fixed slit (not shown), and converted into electric signals. The electric signals outputted from the four photodiodes 11*d* are processed by the signal processing circuit 11*e*. The signals outputted from the signal processing circuit 11*e* are compared by the comparators $11f_A$ and $11f_B$, and the compared results are outputted as pulses. The pulses ENC-A and ENC-B outputted from the comparators $11f_A$ and $11f_B$, are outputs of the encoder 11.

Figure 14:
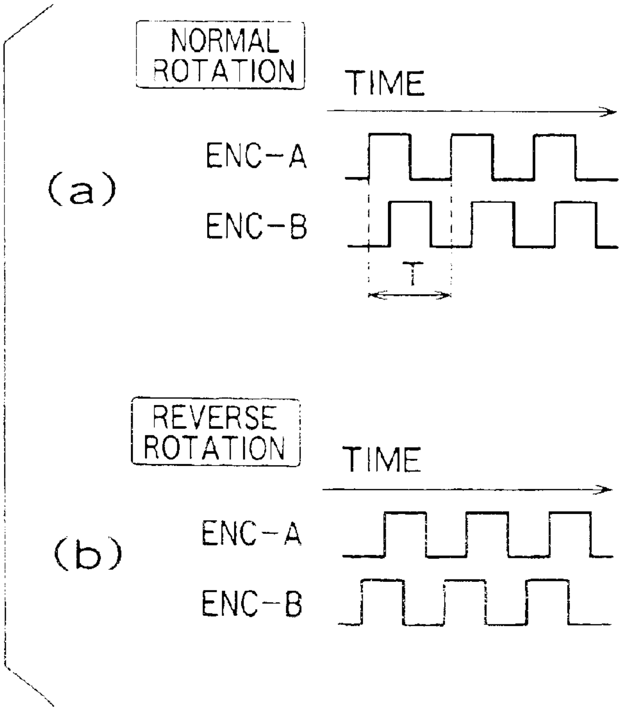
FIGS. 14(*a*) and 14(*b*) are waveform illustrations of output pulses of an encoder.

The phase of the pulse ENC-A is different from the phase of the pulse ENC-B by 90 degrees. The encoder 4 is designed so that the phase of the pulse ENC-A is advanced from the pulse ENC-B by 90 degrees as shown in FIG. 14(*a*) when the CR motor 4 is normally rotating, i.e., when the carriage 3 is moving a main scanning direction, and the phase of the pulse ENC-A lags behind the pulse ENC-B by 90 degrees as shown in FIG. 14(*b*) when the CR motor 4 is reversely rotating. One period T of the pulses corresponds to the distance between adjacent slits of the code plate 12 (e.g., 1/180 inches (=1/180×2.54 cm)). This is equal to a period of time, in which the carriage 3 moves between the adjacent slits.

On the other hand, the rotary type encoder 13 for use in the PF motor 1 has the same construction as that of the linear type encoder 11, except that the code plate is a rotating disk which rotates in accordance with the rotation of the PF motor 1. Furthermore, in the ink jet printer, the distance between adjacent slits of a plurality of slits provided in the code plate of the encoder 13 for use in the PF motor is 1/180 inches (1/180×2.54 cm). When the PF motor 1 rotates by the distance between adjacent slits, the paper is fed by 1/1440 inches (=1/1440×2.54 cm).

Figure 15:
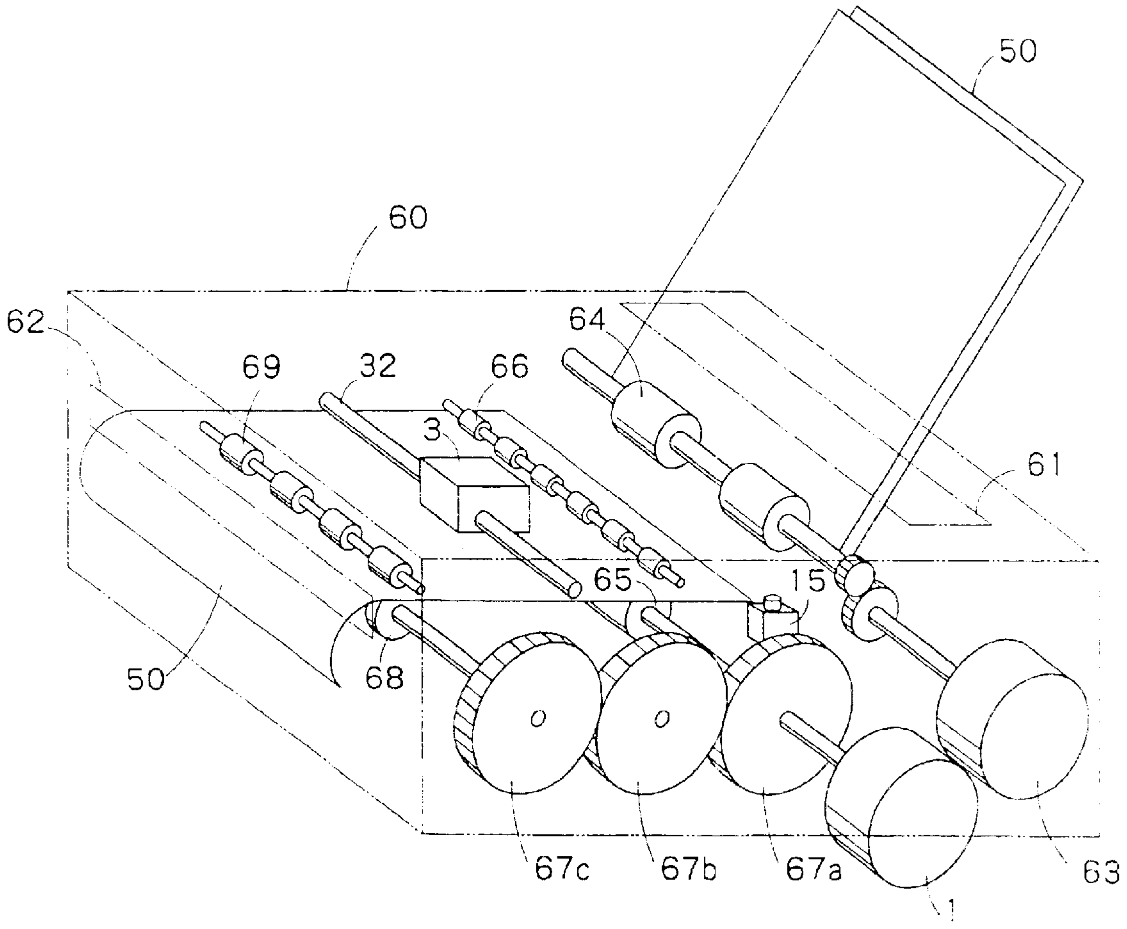
FIG. 15 is a schematic perspective view of a printer for explaining the position of a paper detecting sensor.

Referring to FIG. 15, the position of the paper detecting sensor 15 shown in FIG. 11 will be described below.

In FIG. 15, the paper 10 inserted into a paper feeding port 61 of a printer 60 is fed into the printer 60 by means of a paper feeding roller 64 which is driven by a paper feeding motor 63. The front edge of the paper 50, which has been fed into the printer 60, is detected by, e.g., an optical paper detecting sensor 15. The paper 50, the front edge of which has been detected by the paper detecting sensor 15, is fed by means of a paper feed roller 65 and a driven roller 66 which are driven by the PF motor 1.

Subsequently, ink drops from the recording head (not shown), which is fixed to the carriage 3 moving along the carriage guide member 32, to carry out a print. Then, when the paper is fed to a predetermined position, the rear edge of the paper 50, which is currently being printed, is detected by the paper detecting sensor 15. Then, a gear 67*c* is driven, via a gear 67*b*, by means of a gear 67*a* which is driven by the PF motor 1. Thus, a paper discharging roller 68 and a driven roller 69 are rotated to discharge the printed paper 50 from a paper discharging port 62 to the outside.

Wiping and rubbing will be discussed as examples of a load applied to the carriage 3. Wiping is a process of wiping a nozzle plate with a rubber blade, for example. Rubbing is, a more forcible process than wiping, to rub a nozzle plate with a blade covered with a cloth of woven fine fibers having a high ink absorbing property. Rubbing is like rubbing a board with coarse sandpaper. On the other hand, wiping is like finishing the board with fine sandpaper. In other words, rubbing is to forcible rub large bumps (foreign particles) on the board.

Wiping and rubbing operations will be explained with reference to FIG. 21.

An ink jet printer to which a print control unit according the present invention is installed is provided with a wiper made of wiping and rubbing blades bonded to each other.

Figure 21:
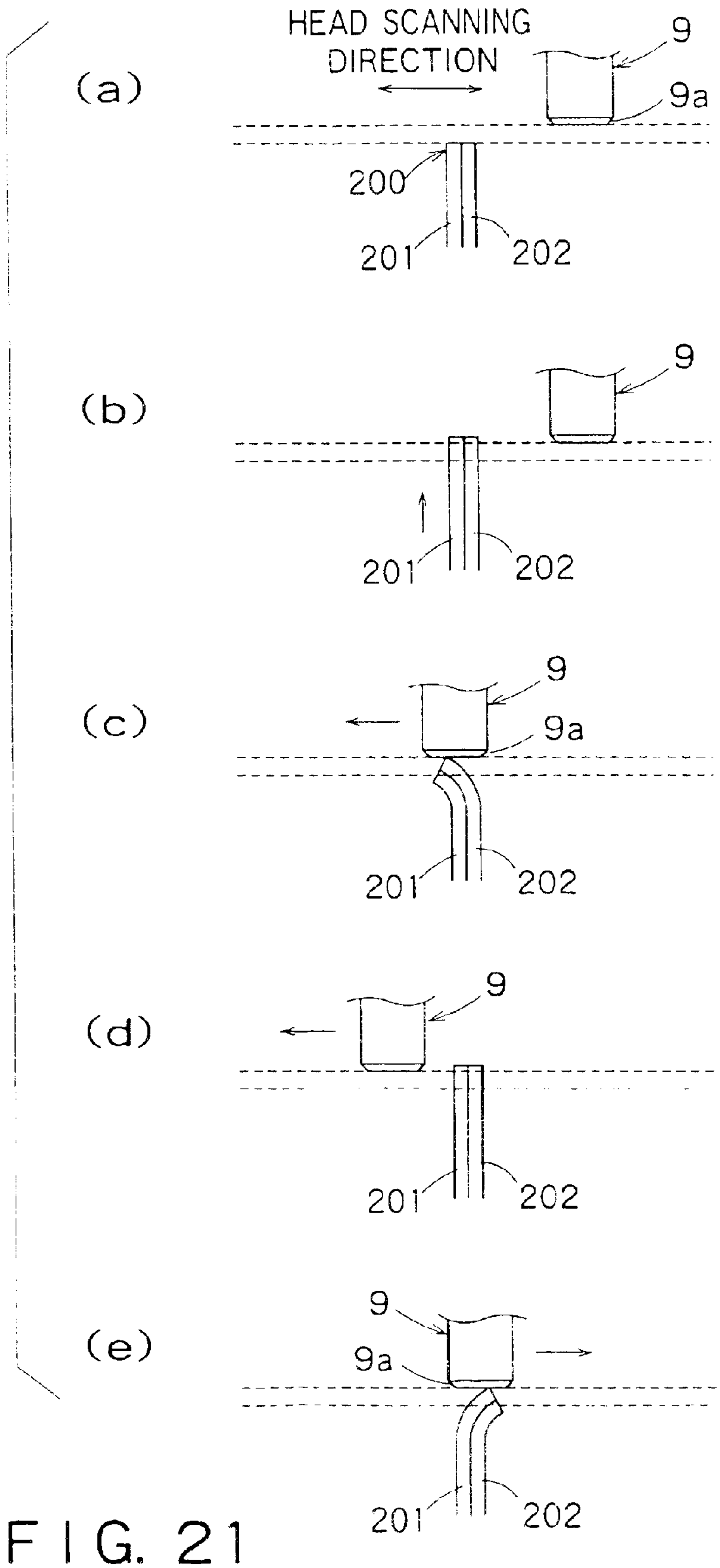
FIGS. 21(*a*) through 21(*e*) illustrate wiping and rubbing as examples of load applied to a carriage.

As shown in FIG. 21, a wiper 200 has a rubbing blade 201 (the left side) and a wiping blade 202 (the right side) bonded to each other (see FIG. 21(*a*)). The wiper 200 juts out during a wiping or a rubbing operation so that it touches an ink jet-type recording head 9 while moving in the scanning directions (See FIG. (b), (c)).

While the recording head 9 is moving in the scanning directions, a nozzle plate 9*a* is wiped by the wiper 200 (See FIG. (c), (e)). Wiping or rubbing is performed according to the wiping direction of the wiper 200. FIG. 21(*c*) illustrates a wiping operation in which the nozzle plate 9*a* is wiped with the wiping blade 202. On the other hand, FIG. 21(*e*) illustrates a rubbing operation in which the nozzle plate 9*a* is rubbed with the rubbing blade 201.

(First Preferred Embodiment)

Figure 1:
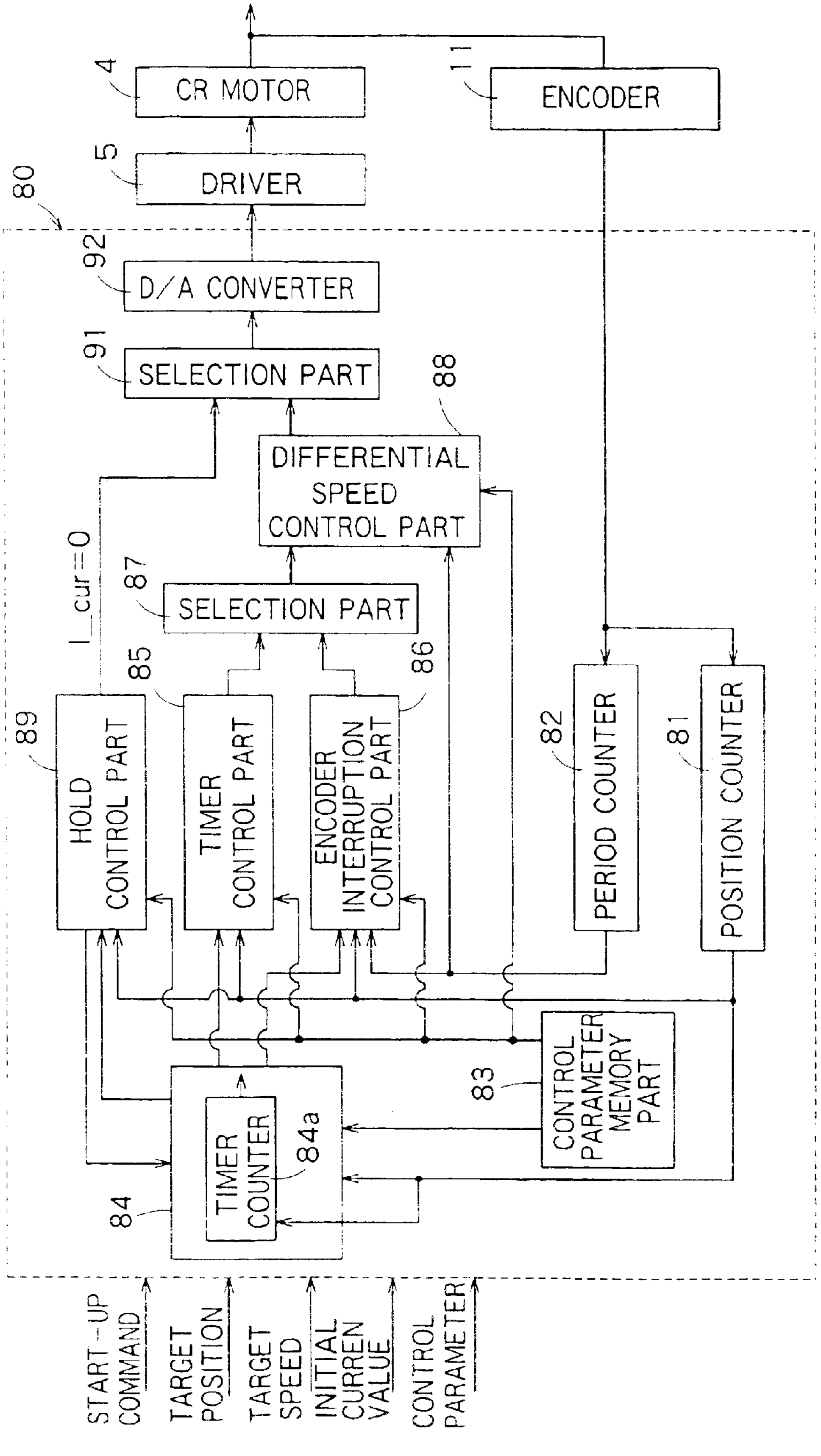
FIG. 1 is a block diagram showing the construction of the first preferred embodiment of a print control unit according to the present invention.

The construction of the first preferred embodiment of a print control unit according to the present invention is shown in FIG. 1.

A print control unit 80 in this embodiment is installed in the DC unit 6 shown in FIG. 11. The print control unit 80 is provided with a position counter 81, a period counter 82, a control parameter memory part 83, a selection control part 84, a timer interruption control part 85, an encoder interruption control part 86, a selection part 87, a differential speed control part 88, a hold control part 89, a selection part 91, and a D/A converter 92.

The print control unit 80 is used for a control in such a way that the carriage 3 is transferred to a target position and stopped there even if unexpected load is applied to the carriage. This control is called a load-applied positioning control hereinafter.

The position counter 81 is designed to detect the leading and trailing edges of each of the output pulses ENC-A and ENC-B of the encoder 11 to count the number of the detected edges, and to output pulses in synchronism with the leading and trailing edges. In this counting, when the CR motor 4 is normally rotating, if one edge is detected, "+1" is added, and when the CR motor 4 is reversely rotating, if one edge is detected, "−1" is added. Each of the periods of the pulses ENC-A and ENC-B is equal to the distance between adjacent slits of the code plate 12, and the phase of the pulse ENC-A is different from the phase of the pulse ENC-B by 90 degrees. Therefore, the counted value "1", in the above described counting corresponds to ¼ of the distance between adjacent slits of the code plate 12. Thus, if the counted value is multiplied by ¼ of the distance between adjacent slits, it is possible to obtain the transfer amount of the carriage 3 from a position corresponding to a counted value "0". A position of the carriage 3 can be decided with reference to the home position that is the position at the counted value zero.

At this time, the definition of the encoder 11 is ¼ of the distance between adjacent slits of the code plate 12. If the distance between adjacent slits is 1/180 inches (=1/180×2.54 cm), the definition is 1/720 inches (=1/720×2.54 cm).

The period counter 82 detects the leading and trailing edges of each of the output pulses ENC-A and ENC-B, to count time (period) in which the carriage 3 is transferred for one-fourth of a slit interval of the code plate 12 by timer counting, for example, thus outputting a counted value T_cur. A speed of the carriage 3 is obtained as $\lambda/(4\times T\_cur)$ where $\lambda$ is a slit interval of the code plate 12.

The control parameter memory part 83 stores control parameters that will be necessary for the load-applied positioning control. The control parameters are, for example, as listed in Table of FIG. 9, a target speed of the carriage 3 driven based on a start-up command for load-applied positioning control, a timer setting time Timer, a threshold levels T_limitL, T_limit, T_limitD of a period (speed), incremental or decremental values I_step1, I_step2, I_step3 of a current to be supplied to the CR motor 4, a current value I_hold, corresponding to a friction load, to be supplied to the CR motor 4 for holding the carriage 3, an initial current value I_start to be supplied to the CR motor 4 for starting the carriage 3, and an upper limit value I_max of a current to be supplied to the CR motor 4.

In FIG. 9, the target speed is classified, for example, into a creeping speed, a normal speed and a high speed. The target speeds at the creeping speed, normal speed and high speed are $a_{v1}$, $a_{v2}$, and $a_{v3}$ cps (character per second), respectively, ($a_{v1}<a_{v2}<a_3$).

A Timer value $b_{Tmi}$, a T_limitL value $b_{TLi}$, a T_limit value $b_{Ti}$, a T_limitD value $b_{TDi}$, an I_step1 value $c_{1i}$, an I_step2 value $c_{2i}$, an I_step3 value $c_{3i}$, an I_hold value $c_{ti}$, an I_start value $c_{si}$, and an I_max value $c_{mi}$ are given for each target speed $a_{vi}$ (i=1, 2, 3).

Figure 10:
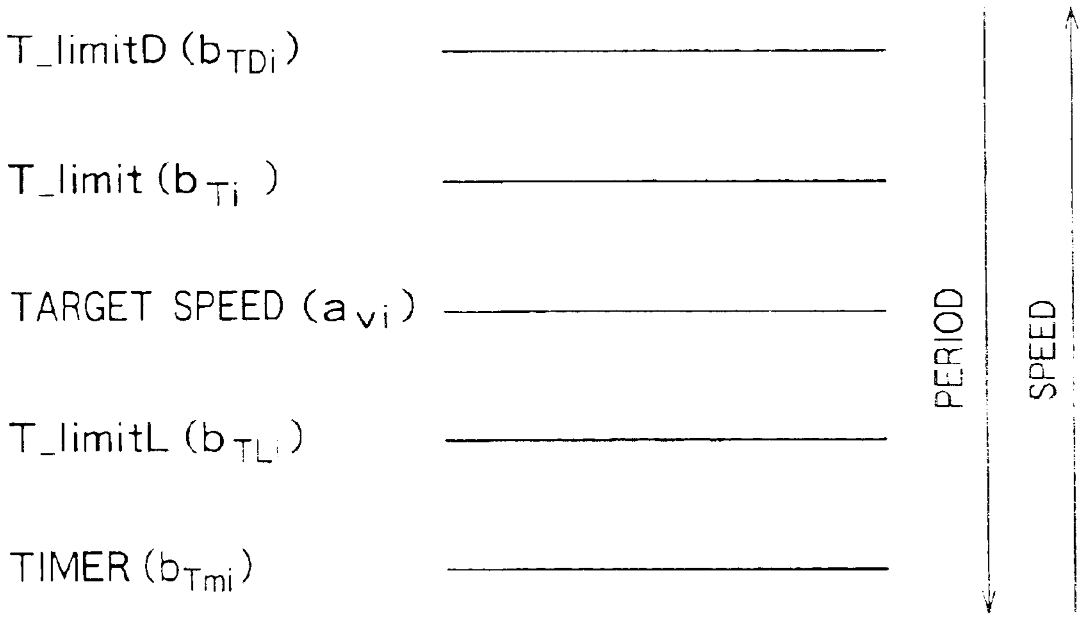
FIG. 10 illustrates the relationship among the control parameters.

As illustrated in FIG. 10, the relationship among the control parameters are as follows:

$b_{Tmi}>b_{TLi}>b_{Ti}>b_{TDi}$ for each target speed $a_{vi}$ (i=1, 2, 3);
$>b_{Tm1}>b_{Tm2}>b_{Tm3}$ for $b_{Tmi}$ (i=1, 2, 3);
$b_{TL1}>b_{TL2}>b_{TL3}$ for $b_{T1i}$ (i=1, 2, 3);
$b_{T1}>b_{T2}>b_{T3}$ for $b_{Ti}$ (i=1, 2, 3); and
$b_{TD1}>b_{TD2}>b_{TD3}$ for $b_{TDi}$ (i=1, 2, 3)

The selection control part 84 has a timer counter 84*a*. A set value Timer for the timer counter 84*a* is selected and set from the control parameter memory part 83 based on a start-up command and a target speed fed by the CPU 16 (FIG. 11) for positioning control. As shown in FIG. 9, the set value Timer for the timer counter 84*a* is set at the value $b_{Tm2}$ when the target speed is a normal speed $a_{v2}$. At the same time, an initial current value I_start is also selected according to the target speed, and a current I_cur to be supplied to the CR motor 4 is initially set at I_start (I_cur=I_start). The set current value I_cur is supplied to the CR motor 4.

Once the values are set as above, the timer counter 84*a* starts and continues counting until the counted value reaches the set value. The timer counter 84*a* is reset when the counted value reaches the set value and the counter 84*a* receives the output pulses of the position counter 81, and restarts counting.

Figure 3:
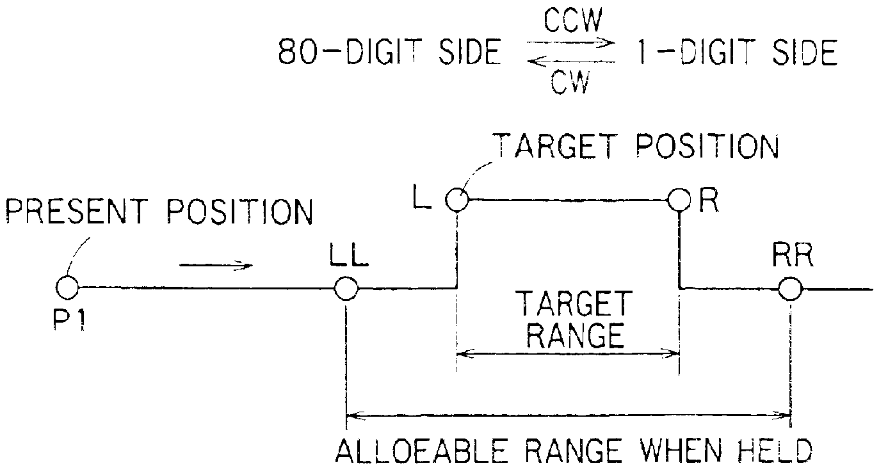
FIG. 3 illustrates the relationship between the present position and a target position of a carriage.

The selection control part 84 selects the hold control part 89 in response to the output pulses of the position counter 81 when the carriage 3 is located within a target range including a target position, as illustrated in FIG. 3.

On the other hand, when the carriage 3 is located outside the target range, the selection control part 84 selects the timer interruption control part 85 or the encoder interruption control part 86 based on a counted value T of the timer counter 84*a* when receiving the output pulses of the position counter 81.

In detail, the selection control part 84 selects the timer interruption control part 85 when the control part 84 receives no output pulses of the position counter 81 even though the counted value T has reached the set value Timer (it is assumed that T>Timer), or the carriage 3 is stopping or it is moving at a speed extremely slower than the target speed; while selects the encoder interruption control part 86 when the counted value T is equal to or smaller than the set value Timer.

As disclosed, the selection control part 84 performs a selecting operation to select one of the three control parts 85, 86 and 89 for each reception of the output pulses of the position counter 81, or for each transfer of the carriage 3 for one-fourth of the slit interval $\lambda$ of the code plate 12 or when the counted value T of the timer counter 84*a* reaches the set value Timer.

The timer interruption control part 85, when selected by the selection control part 84, decides a current I_cur to be supplied to the CR motor 4 and feeds the current to the selection part 87 based on the position and the transfer direction of the carriage 3 obtained from the output of the position counter 81.

The encoder interruption control part 86, when selected by the selection control part 84, decides a current I_cur to be supplied to the CR motor 4 and feeds the current to the selection part 87 based on the position and the transfer direction of the carriage 3 obtained from the output of the position counter 81, and also a period T_cur obtained from the output of the period counter 82.

The selection part 87 selects the output of the timer interruption control part 85 when the control part 85 is selected, while selects the output of the encoder interruption control part 86 when the control part 86 is selected. The selected output is fed to the differential speed control part 88.

The differential speed control part 88 operates for each reception of the output of the period counter 82, to calculate a speed deviation of the present speed of the carriage 3 from a reference speed based on a period T-cur obtained from the output of the period counter 82 for decision of an incremental or a decremental current value I-crtD in accordance with the difference between the speed deviation and another speed deviation calculated just before the speed deviation. The differential speed control part 88 then adds the current value I-crtD and the output I_cur of the selection part 87. The addition result is output as a current I_cur that will be supplied to the CR motor 4.

The hold control part 89 decides a current I_cur to be supplied to the CR motor 4 so that the carriage 3 remains in an allowable range shown in FIG. 3 when it is held and located in the allowable range based on the position and the transfer direction of the carriage 3 obtained from the output of the position counter 81, while operates the timer interruption control part 85 or the encoder interruption control part 86 when the carriage 3 is located outside the allowable range.

The selection part 91 selects the output of the hold control part 89 when the control part 89 is selected, while selects the output of the differential speed control part 88 when the control part 89 is not selected. The selected current value I_cur to be supplied to the CR motor 4 is fed to the D/A convert 92, and converted into an analog current. The CR motor 4 is then driven by the driver 5 based on the analog current.

The driver 5 has, e.g., four transistors. By turning each of the transistors ON and OFF on the basis of the output of the D/A converter **6*j*, the driver 5 can be selectively in (a) an operation mode in which the CR motor 4** is normally or reversely rotated, (b) a regenerative brake operation mode (a short brake operation mode, i.e., a mode in which the stopping of the CR motor is maintained), or (c) a mode in which the CR motor is intended to be stopped.

The operation of the print control unit 80 according to the present invention will be explained with reference to FIG. 2.

A position of the carriage 3 just before accepting a start-up command for load-applied positioning control is denoted by P1 as shown in FIG. 3 which illustrates transfer of the carriage 3 from the position P1 to a target range including a target position L as one of the terminals of the target range and stoppage of it within the range. When the carriage 3 is transferred beyond the target range, or to the right side of a position R that is the other terminal of the target range, the target position is not the position L but the position R. In other words, the target position for the carriage 3 is one of the terminals of the target range, which is closer to the position of the carriage 3 when it is located outside the target range.

The CPU 16 feeds a start-up command for load-applied positioning control and also control parameters including a target position, a target speed and an initial current value I_start to the print control unit 80. The control parameters are stored in the control parameter memory part 83. The timer counter **84*a* is set at a set value Timer according to the target speed and starts counting. Moreover, a current value I_cur to be supplied to the CR motor 4 is set at I_start (I_cur=I_start). The current value I_start is then supplied to the CR motor 4 (see step F1 in FIG. 2**).

Figure 2:
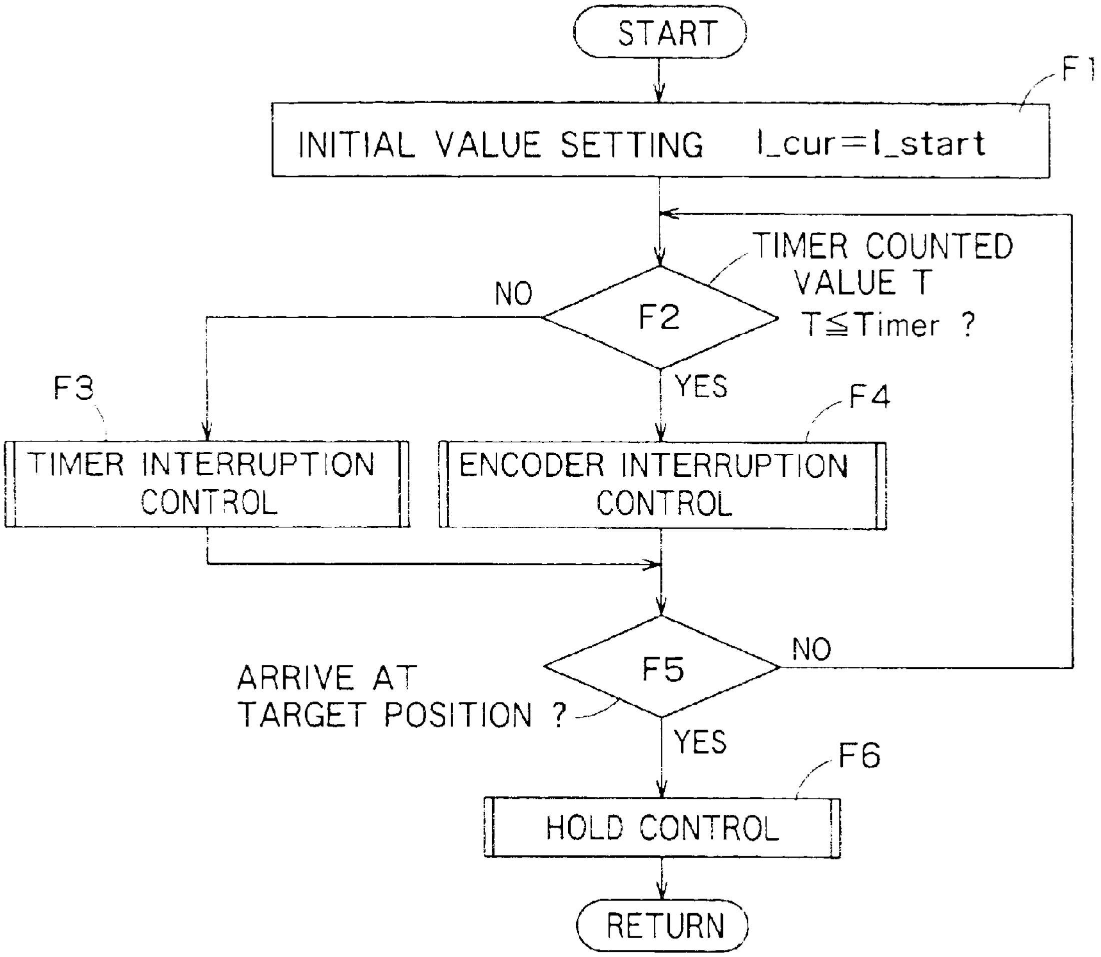
FIG. 2 is a flow chart showing the operation of the print control unit according to the present invention.

When the timer counter 84 receives no pulses from the position counter 81 after it has started counting and the counted value T reaches a set value Timer (it is assumed that T>Timer), the selection control part 84 selects the timer interruption control part 85 for timer interruption control processing (see steps F2 and F3 in FIG. 2).

On the other hand, when the counted value T is equal to or smaller than the set value Timer, the selection control part 84 selects the encoder interruption control part 85 for encoder interruption control processing (see steps F2 and F4 in FIG. 2).

A current value I_cur to be supplied to the CR motor 4 is decided by the selected control part, and fed to the differential speed control part 88 via the selection part 87.

The differential speed control part 88 decides an incremental or a decremental current value I_crtD and adds this value and the current value I_cur to produce a new current value I_cur to be supplied to the CR motor 4. The newly produced current value I_cur is fed to the D/A converter 92 via the selection part 91, and converted into an analog current. The analog current is fed to the driver 5 for driving the CR motor 4 so that the current value supplied to the CR motor 4 reaches the value I_cur.

The selection control part 84 judges as to whether the carriage 3 arrives at the target position, or within the target range when it receives the pulses from the position counter 81 or the counted value T of the timer counter **84*a* reaches the set value Timer (see step F5 in FIG. 2). If not, the process returns to step F2 and repeats the foregoing steps. If yes, the selection control part 84 selects the hold control part 89 for hold control processing (see step F6 in FIG. 2). The CR motor 4 is then driven based on the current value I_cur, that has been decided by the hold control part 89, supplied thererto via the D/A converter 92 and the driver 5**.

Next, an example of timer interruption control performed by the timer interruption control part 85 will be explained with reference to FIG. 4 that illustrates carriage transfer from 80-digit side to 1-digit side, or from the left to right in FIG. 3.

Figure 4:
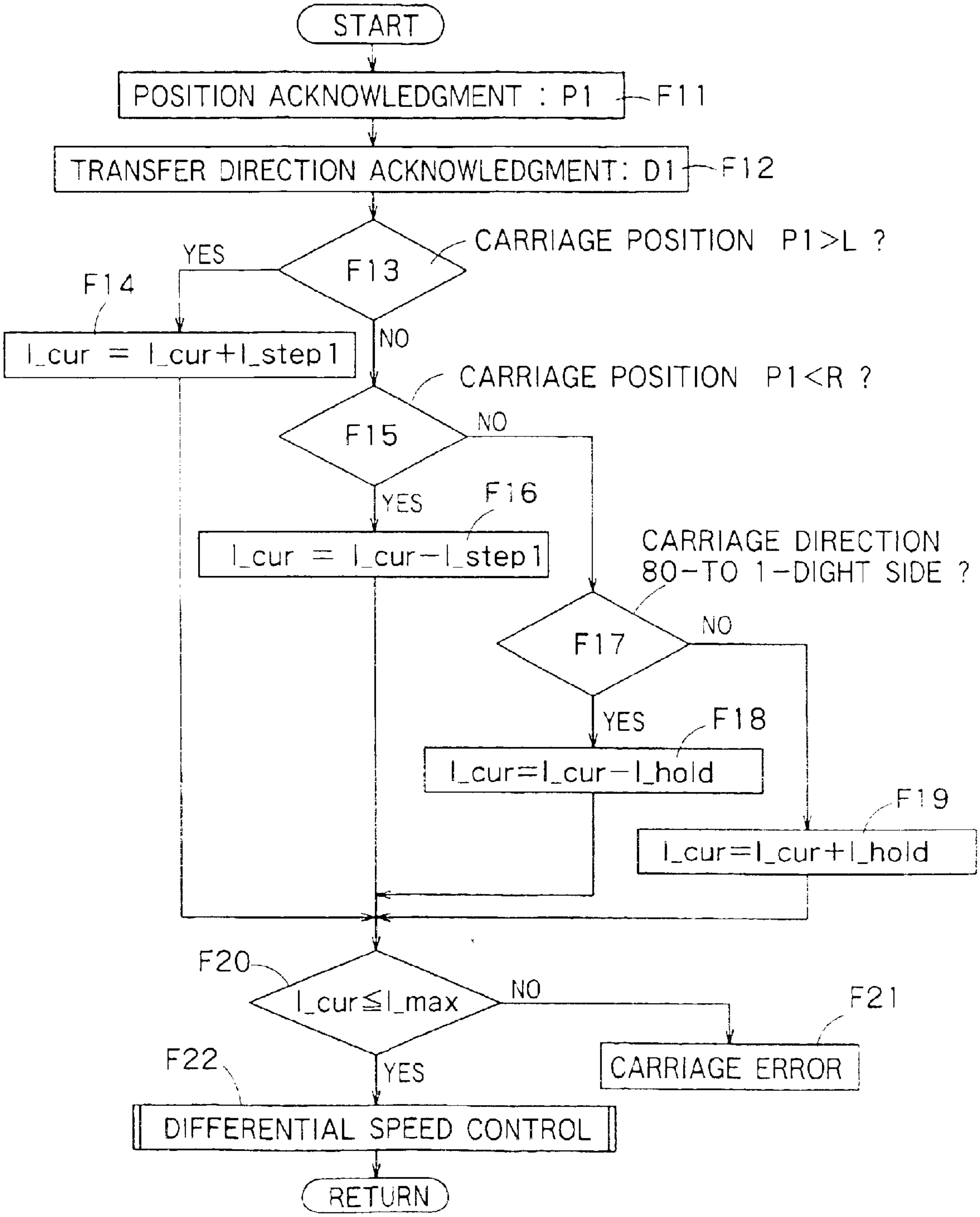
FIG. 4 is a flow chart showing the operation of timer interruption control according to the present invention.

When the timer interruption control part 85 is selected by the selection control part 84, it acknowledges the position P1 and transfer direction of the carriage 3 based on the output of the position counter 81 (see steps F11 and F12 in FIG. 4). The value counted by the position counter 81 increases as the carriage 3 is moving from the 1- to 80-digit side.

The timer interruption control part 85 compares the present position of the carriage 3 and the position L the left terminal of the target range (see step F13 in FIG. 4).

When the position P1 of the carriage 3 is located at the left side of the position L, as shown in FIG. 3, or the counted value of the position counter 81 at the position P1 is larger than that at the position L, the current value I_step1 which has been stored in the control parameter memory part 83 is added to the present current value I_cur, and the current value I_cur to be supplied to the CR motor 4 is updated to the addition result (I_cur+I_step1). The current value I_step1 is a value decided according to a target speed.

On the other hand, in step F13, when the position P1 of the carriage 3 is not located at the left side of the position L, the process goes to step F15 to compare the position P1 and the position R, the right terminal of the target range.

When the position P1 of the carriage 3 is located at the right side of the position R (see FIG. 3), or the counted value of the position counter 81 at the position P1 is smaller than that at the position R, the current value I_step1 is subtracted from the present current value I_cur so that the carriage 3 is located within the target range, and the current value I_cur to be supplied to the CR motor 4 is updated to the subtraction result (I_cur−I_step1) (see step F16 in FIG. 4).

On the other hand, in step F15, when the position P1 of the carriage 3 is not located at the right side of the position R, or the position P1 is located within the target range, the process goes to step F17.

When the transfer direction of the carriage 3 is from the 80- to 1-degit side, or the carriage 3 is moving from left to right, a current value I_hold that has been stored in the control parameter memory part 83, and corresponds to friction load is subtracted from the present current value I_cur. The current value I_cur to be supplied to the CR motor 4 is then updated to the subtraction result (I_cur−I_hold) (see step F18 in FIG. 4).

On the other hand, in step F17, when the transfer direction of the carriage 3 is from the 1- to 80-degit side, the process goes to step F19 to add the current value I_hold to the present current value I_cur. The current value I_cur to be supplied to the CR motor 4 is then updated to the addition result (I_cur+I_hold).

The current value I_cur calculated as explained above is compared with the current upper limit value I_max that has been stored in the control parameter memory part 83 by the timer interruption control part 85 (see step F20 in FIG. 4).

When the current value I_cur exceeds the current upper limit value I_max, this means a carriage error; hence an error message is went off to outside. The carriage 3 is then stopped and the CR motor 4 is driven at the short brake operation.

On the other hand, when the current value I_cur is equal to or smaller than the current upper limit value I_max, the process goes to step F22 for differential speed control processing by the differential speed control part 88. The differential speed control processing will be explained in detail later.

Figure 5:
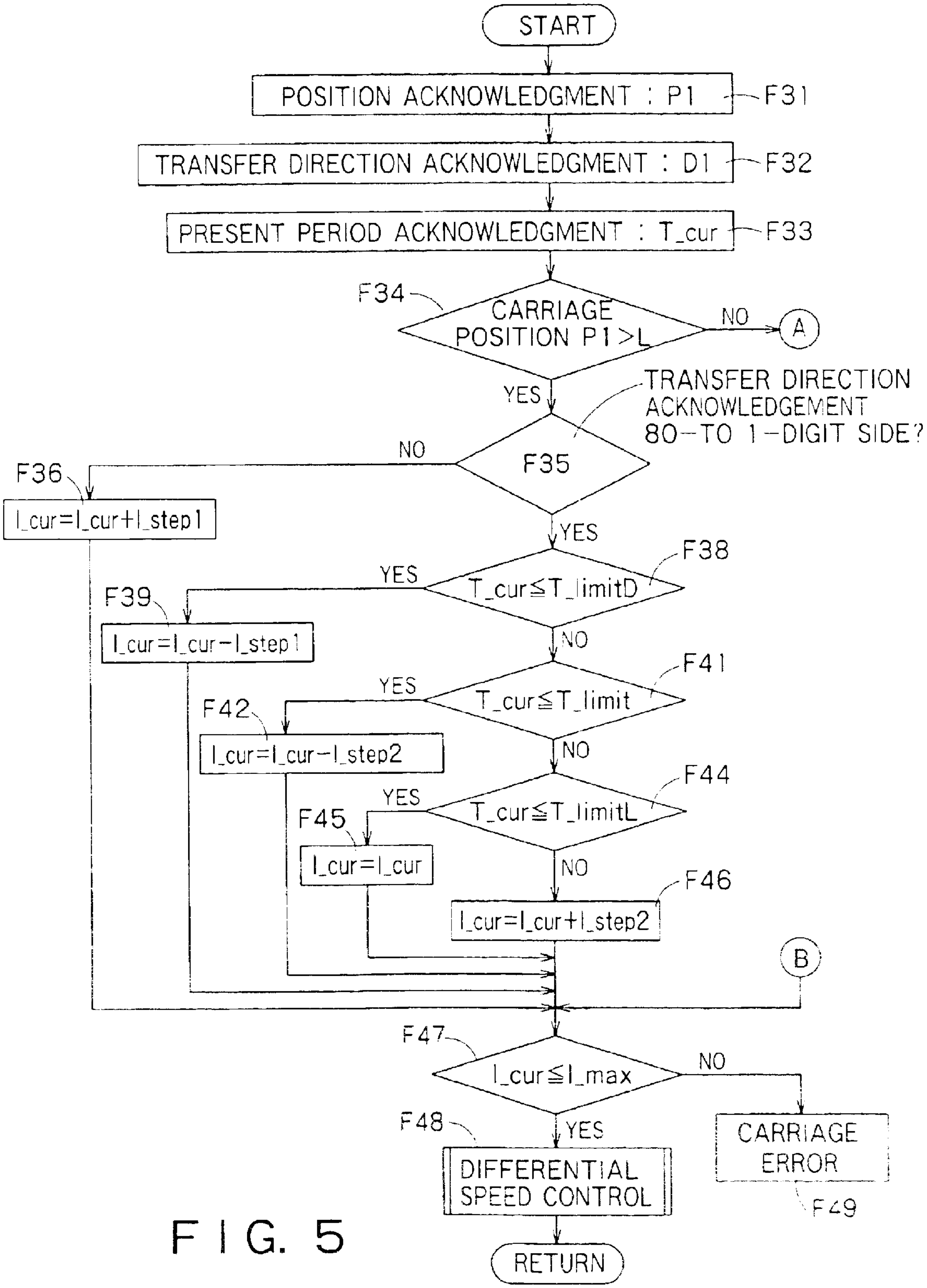
FIG. 5 is a flow chart showing the operation of encoder interruption control according to the present invention.
Figure 6:
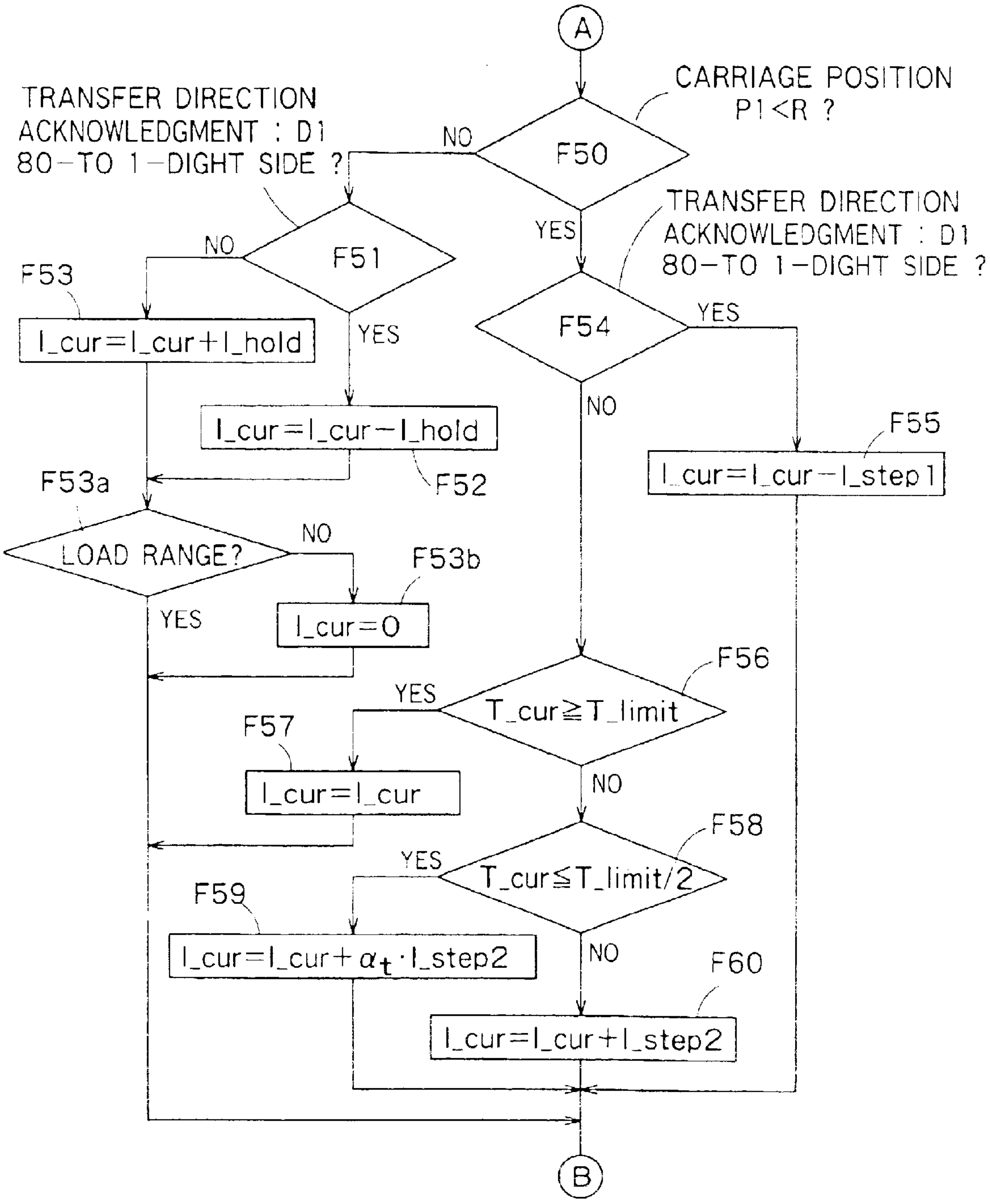
FIG. 6 is another flow chart showing the operation of encoder interruption control according to the present invention.

Disclosed next with reference to FIGS. 5 and 6 is an example of encoder interruption control processing performed by the encoder interruption control part 86.

When the encoder interruption control part 86 is selected by the selection control part 84, it acknowledges the position P1 and the transfer direction D1 of the carriage 3 based on the output of the position counter 81 (see steps F31, F32 in FIG. 5). The encoder interruption control part 86 also acknowledges the present period T_cur obtained from the output of the period counter 82 (see step F33 in FIG. 5).

Next, the encoder interruption control part 86 compares the present position P1 of the carriage 3 and the position L, the left terminal of the target range (see step F34 in FIG. 5).

When the position P1 is located at the right side of the position L, or the counted value at the position P1 of the position counter 81 is equal to or smaller than that of the position L, the process goes to step F50, shown in FIG. 6, which will be explained in detail later.

On the other hand, when the position P1 is located at the left side of the position L, the process goes to step F35 in which the encoder interruption control part 86 judges as to whether the transfer direction of the carriage 3 is from the 80- to 1-digit side.

When the transfer direction of the carriage 3 is from the 1- to 80-digit side, the process goes to step F36 to add the incremental or decremental current value I_step1 that has been stored in the control parameter memory part 83 to the present current value I_cur. The current value I_cur to be supplied to the CR motor 4 is then updated to the addition result (I_cur+I_step1).

On the other hand, when the transfer direction of the carriage 3 is from the 80- to 1-digit side in step F35, the process goes to step F38 to compare the present period T_cur and the threshold value T_limitD that has been stored in the control parameter memory part 83.

If T_cur≦T_limitD, the process goes to step F39 to subtract the current value I_step1 from the present current value I_cur. The current value I_cur to be supplied to the CR motor 4 is then updated to the subtraction result (I_cur−I_step1).

On the other hand, if not T_cur≦T_limitD in step F38, the process goes to step F41 to compare the present period T_cur and the threshold value T_limit that has been stored in the control parameter memory part 83.

If T_cur≦T_limit, the process goes to step F42 to subtract the current value I_step2 from the present current value I_cur. The current value I_cur to be supplied to the CR motor 4 is then updated to the subtraction result (I_cur−I_step2).

On the other hand, if not T_cur≦T_limit in step F41, the process goes to step F44 to compare the present period T_cur and the threshold value T_limitL.

If T_cur≦T_limitL, the current value I_cur to be supplied to the CR motor 4 is set at the present current value I_cur (see step F45 in FIG. 5). On the other hand, if not T_cur≦T_limitL, the current value I_step2 is added to the present current value I_cur. The current value I_cur to be supplied to the CR motor 4 is then updated to the addition result (I_cur+I_step2).

As disclosed, in summary, when the speed (proportional to 1/T_cur) of the carriage 3 that is moving to the target position L is equal to or higher than a first predetermined speed (proportional to 1/T_limit), the current value to be supplied to the CR motor 4 is decreased so that the carriage 3 does not overshoot (see steps F38 to F42); on the other hand, when the speed of the carriage 3 is slower than a second predetermined speed (proportional to 1/T_limitL), the current value to be supplied to the CR motor 4 is increased so that the carriage 3 does not stop (see steps F44 and F46).

Moreover, when the carriage speed is slower than the first predetermined speed but equal to or higher than the second predetermined speed, the current value to be supplied to the CR motor 4 will not be changed (see step F45 in FIG. 5).

The disclosure goes back to step F34, and the explanation is given to the case where the position P1 of the carriage 3 is not located at the left side of the position L.

The process goes to step F50 (see FIG. 6) in this case, to judge as to whether the position P1 of the carriage 3 is located at the right side of the position R.

When the position P1 of the carriage 3 is not located at the right side of the position R, or the carriage 3 is located within the target range, the process goes to step F51 to judges whether the transfer direction D1 of the carriage 3 is from the 80- to 1-digit side.

When the transfer direction D1 is from the 80- to 1-digit side, the process goes to step F52 to subtract a current value I_hold corresponding to friction load from the present current value I_cur. The current value I_cur to be supplied to the CR motor 4 is then updated to the subtraction result (I_cur−I_hold).

On the other hand, when the transfer direction D1 is from the 1- to 80-digit side, the process goes to step F53 to add the current value I_hold to the present current value I_cur. The current value I_cur to be supplied to the CR motor 4 is then updated to the addition result (I_cur+I_hold).

The process then goes to step F53*a* to judge as to whether the present position of the carriage 3 is located within a predetermined load range. The current I_cur to be supplied to the CR motor 4 is set at zero only it the carriage 3 is not located within the predetermined load range (step F53*b*).

In step F50, when the position P1 of the carriage 3 is located at the right side of the position R, the process goes to step F54 to judge whether the transfer direction D1 of the carriage 3 is from the 80- to 1-digit side.

When the transfer direction D1 of the carriage 3 is from the 80- to 1-digit side, the process goes to step F55 to subtract an incremental or a decremental current value I_step1 from the present current value I_cur. The current value I_cur to be supplied to the CR motor 4 is then updated to the subtraction result (I_cur−I_step1).

On the other hand, when the transfer direction D1 is from the 1- to 80-digit side, the process goes to step F56 to compare the present period T_cur and the threshold value T_limit.

The current value I_cur to be supplied to the CR motor 4 is updated to the present I_cur if T_cur>T_limit (see step F57 in FIG. 6).

On the other hand, if not T_cur>T_limit, the process goes to step F58 to judge as to whether the present period T_cur is equal to or smaller than the half of the threshold value T_limit. If yes, the current value I_step2 multiplied by $\alpha_1$ is added to the present current value I_cur. The current value I_cur to be supplied to the CR motor 4 is then updated to the addition result (I_cur+$\alpha_1$·I_step2). The value $\alpha_1$ is a constant which may be obtained by experiments.

When the present period T_cur is not equal to nor smaller than the half of the threshold value T_limit, the process goes to step F60 to add the current value I_step2 to the present current value I_cur. The current value I_cur to be supplied to the CR motor 4 is then updated to the addition result (I_cur+I_step2).

Figure 16:
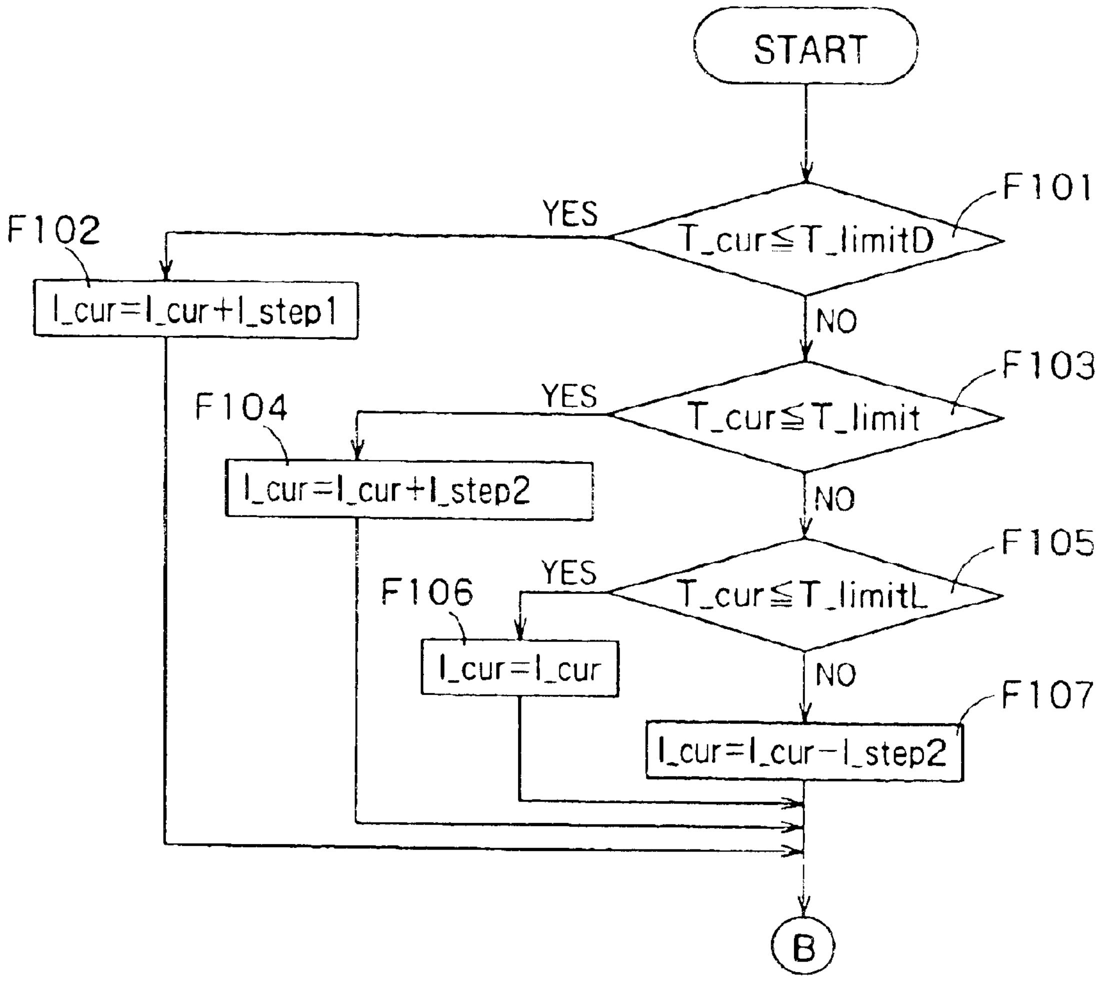
FIG. 16 is a flow chart showing a modification of the operation of the encoder interruption control shown in FIG. 6 according to the present invention.

The steps F56 to F60 as explained above can be replaced with steps F101 to F107 shown in FIG. 16.

In detail, in step F101, the present period T_cur is compared with the threshold value T_limitD that has been stored in the control parameter memory part 83. If T_cur≦T_limitD, the process goes to step F102 to add the current value I_step1 to the present current value I_cur. The current value I_cur to be supplied to the CR motor 4 is then updated to the addition result (I_cur+I_step1).

On the other hand, if not T_cur≦T_limitD in step F101, the process goes to step F103 to compare the present period T_cur with the threshold value T_limit that has been stored in the control parameter memory part 83. If T_cur≦T_limit, the process goes to step F104 to add the current value I_step2 to the present current value I_cur. The current value I_cur to be supplied to the CR motor 4 is then updated to the addition result (I_cur+I_step2).

If not T_cur≦T_limit in step F103, the process goes to step F105 to compare the present period T_cur with the threshold value T_limitL. If T_cur≦T_limitL, the current value I_cur to be supplied to the CR motor 4 is updated to the present current value I_cur (see step F106 in FIG. 16). If not T_cur≦T_limitL, the current value I_step2 is subtracted from the present current value I_cur. The current value I_cur to be supplied to the CR motor 4 is then updated to the subtraction result (I_cur−I_step2).

The disclosure returns to FIG. 5. When the current value I_cur to be supplied to the CR motor 4 is decided as explained above, the process goes to step F47 to compare the decided current value I_cur with the upper limit value I_max.

If not I_cur≦I_max, this means a carriage error; hence the process goes to step F49 to go off an error message to the outside. The carriage 3 is then stopped and the CR motor is driven at the short brake operation. On the other hand, if I_cur≦I_max, the process goes to step F48 for differential speed control processing by the differential speed control part 88.

Figure 7:
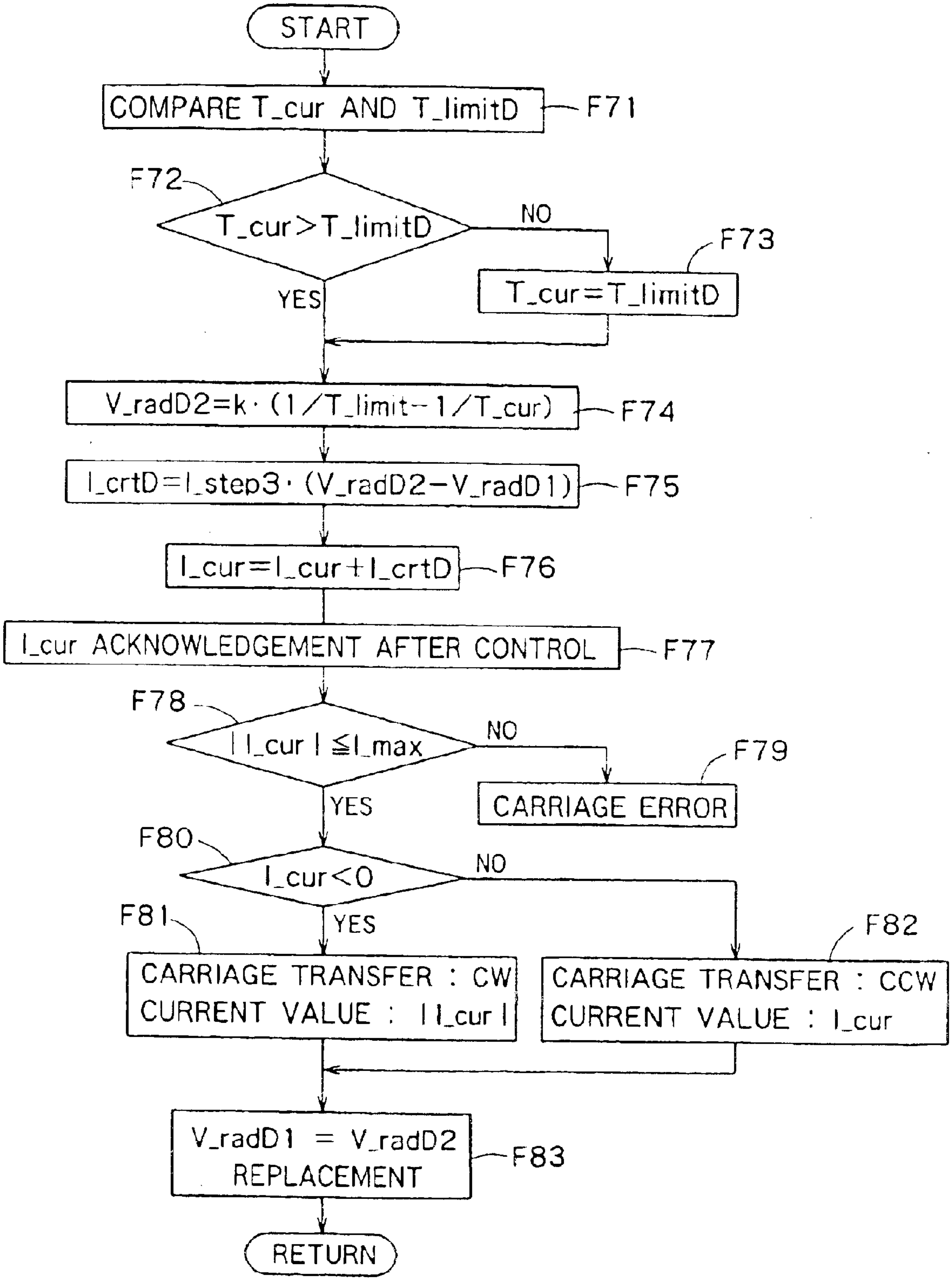
FIG. 7 is a flow chart showing the operation of differential speed control according to the present invention.

Disclosed next with reference to FIG. 7 is an example of differential speed control processing performed by the differential speed control part 88. Shown in FIG. 7 is the case in which the carriage 3 is transferred from the 80- to 1-digit side.

The present period T_cur is compared with the threshold value T_limitD (see steps F71 and F72 in FIG. 7).

If not T_cur>T_limitD, or the speed of the carriage 3 is higher than the speed corresponding to the threshold value T_limitD, the present period T_cur is replaced with T_limitD (see step F73 in FIG. 7), the process goes to step F74.

On the other hand, if T_cur>T_limitD, the process goes to step F74 in which the differential speed control part 88 calculates a speed deviation V_rad2 of a speed k/T_cur corresponding to the present period T_cur from a speed k/T_limit corresponding to the threshold value T_limit. The value k is a constant for obtaining speed from period.

Obtained next is a current value I_crtD proportional to the difference between a speed deviation V_rad1 obtained at a previous operation and the speed deviation V_rad2 obtained at the present operation, as I_crtD=I_step3×(v_rad2−v_rad1) (see step F75 in FIG. 7). The value I_step3 has been stored in the control parameter memory part 83.

The current value I_crtD is then added to the current value I_cur decided by the timer interruption control part 85 or the encoder interruption control part 86 (see step F76 in FIG. 7). The current value I_cur to be supplied to the CR motor 4 is then updated to the addition result (I_cur+I_crtD). The updated current value is fed to the D/A converter 92, and the CR motor 4 is driven by the driver 5 based on the output of the D/A converter 92.

The updated current value I_cur is acknowledged (see step F77 in FIG. 7). In detail, it is judged in step F78 as to whether the absolute value of the updated current value I_cur exceeds the upper limit value I_max. If so, it is judged as a carriage error(see step F79 in FIG. 7), an error massage is went off the outside. The carriage 3 is stopped and the CR motor 4 is driven at the short brake operation.

If I_cur≦I_max in step F78, the process goes to step F80 to judge as to whether the current value I_cur is negative. If negative, it is a current value for carriage transfer from the 1- to 80-digit side (see step F81 in FIG. 7). On the other hand, if positive or zero, it is a current value for carriage transfer from the 80- to 1-digit side (see step F82 in FIG. 7).

In step F83, the value V_rad1 is updated to the value V_rad2 and the process ends.

In the timer interruption control, encoder interruption control and differential speed control as disclosed above, and also the hold control which will be explained later, the control parameters, such as, Timer, T_limitL, T_limit, T_limitD, I_step1, I_step2, I_step3, I_hold, I_start, and I_max are selected generally based on a target speed as shown in FIG. 9.

It is preferable that a target speed for the carriage 3 is switched to a creeping speed from a normal or a high speed when the carriage 3 is transferred from a target position, such as, the position L, to a predetermined range. In this case, under each control described above, control parameters corresponding to the creeping speed are selected with no current value I_cur updating.

An example of hold control processing performed by the hold control part 89 will be explained with reference to FIG. 8 which illustrates carriage transfer from the 80- to 1-digit side.

When the hold control part 89 is selected by the selection control part 84, it acknowledges the position P1 and the transfer direction D1 of the carriage 3 (see steps F91 and F92).

The position P1 of the carriage 3 is compared with a position LL, (FIG. 3), the left terminal of the allowable range under hold control (see step F93). When the position P1 is not located at the left side of the position LL, the process goes to step F94, while goes to step F96 when located at the left side.

In step F94, the present position P1 of the carriage 3 is compared with a position RR (FIG. 3), the right terminal of the allowable range under hold control. When the position P1 is not located at the right side of the position RR, or the carriage 3 is located within the allowable range under hold control, a current value I_cur is not updated (I_cur=I_cur) or updated to zero (I_cur=0) (see step F95 in FIG. 8) for holding the carriage 3. This current value I_cur is fed to the D/A converter 92. The CR motor 4 is driven by the driver 5 based in the output of the D/A converter 92 to stop the carriage 3.

On the other hand, when the position P1 of the carriage 3 is located at the left side of the position RR in step F94, or the carriage 3 is located outside the allowable range, the process goes to step F96 to perform the timer or the encoder interruption control via selection control.

The allowable range under hold control is set wider than the target range (see FIG. 3) for avoiding unnecessary operation, such as, hunching, during the hold control.

As described above, the embodiment of the present invention achieves carriage transfer and stoppage at a target position even unexpected load is applied to the carriage.

In the foregoing embodiment, the control is performed for the time (period) counted by the period counter 82, in which the carriage 3 is transferred by ¼ of the slit interval λ of the code plate 12, or the control is performed by using physical values that correspond to carriage speed.

However, not only this, the control can be performed by using a speed of the carriage 3 corresponding to the inverse of the above period. In this case, among the control parameters, the threshold values T_limitL, T_limit and T_limitD do not represent time but speed. The physical values corresponding to carriage speed include the carriage speed itself in this embodiment.

Moreover, in the foregoing embodiment, the control is performed by using all the edges of the output pulses ENC-A and ENC-B of the encoder 11. However, the control can be performed by using either of the leading and trailing edges of either of the two output pulses, such as, the output pulse ENC-A or using the all edges of either of the output pulses.

Furthermore, in the foregoing embodiment, the control parameters have been stored in the control parameter memory 83, however, they can be supplied by the CPU 16 according to need.

A target speed is not changed from load-applied positioning control start-up to end in the foregoing embodiment. This takes long to finish the load-applied positioning control when a carriage speed is very slow and the carriage is located apart from a target position. A carriage would stop at a position beyond a target range when a carriage speed is a normal or a high speed. This requires carriage transfer to a target position with current supply twice to a CR motor, which also takes long for finishing the load-applied positioning control.

One way to shorten time for load-applied positioning control is a target speed setting at a high or a normal speed when the carriage is located apart from a target position and a target speed change to a creeping speed as the carriage is approching to the target position. Such a control will be explained as the second embodiment.

(Second Preferred Embodiment)

Figure 17:
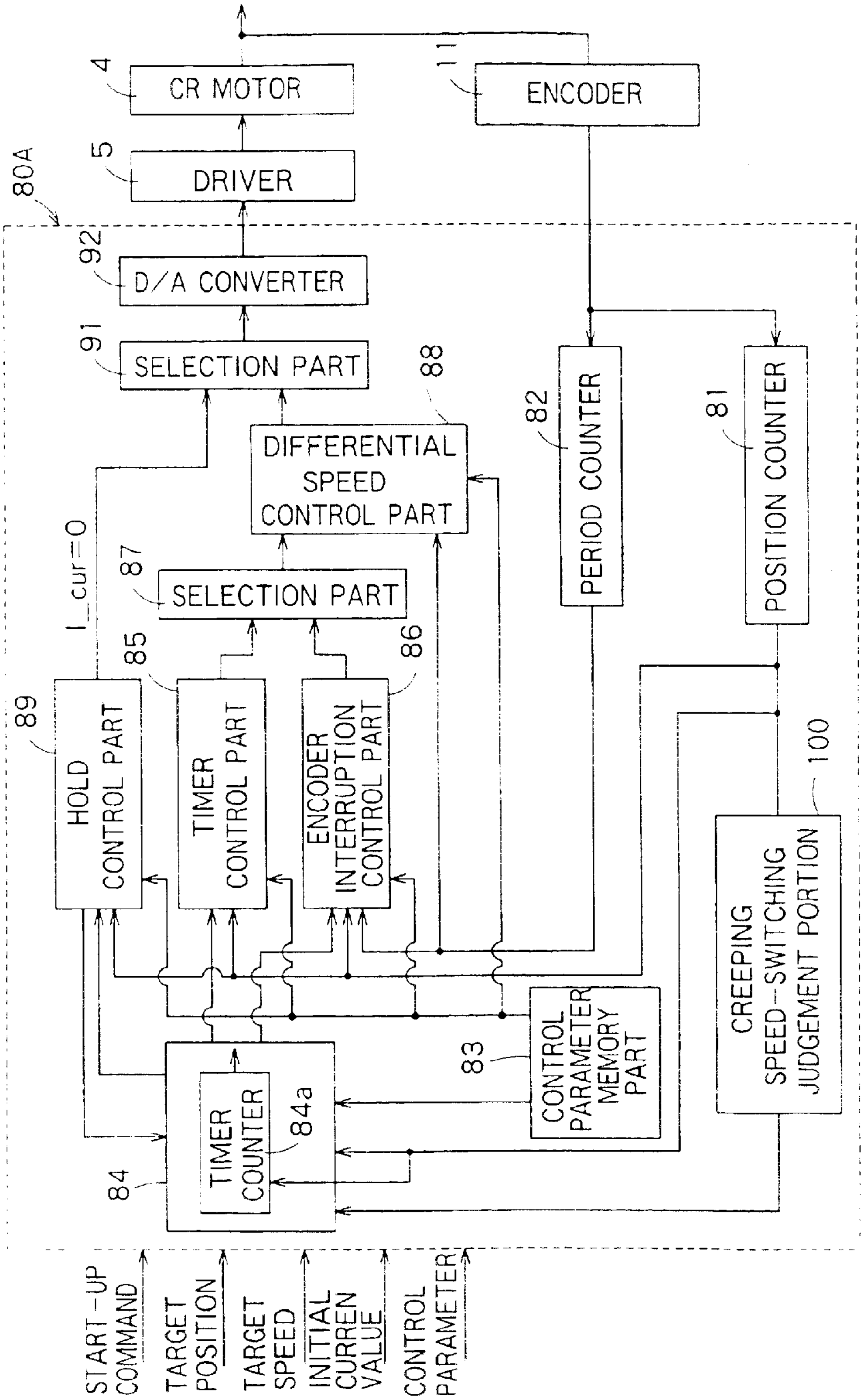
FIG. 17 is a block diagram showing the construction of the second preferred embodiment of a print control unit according to the present invention.
Figure 18:
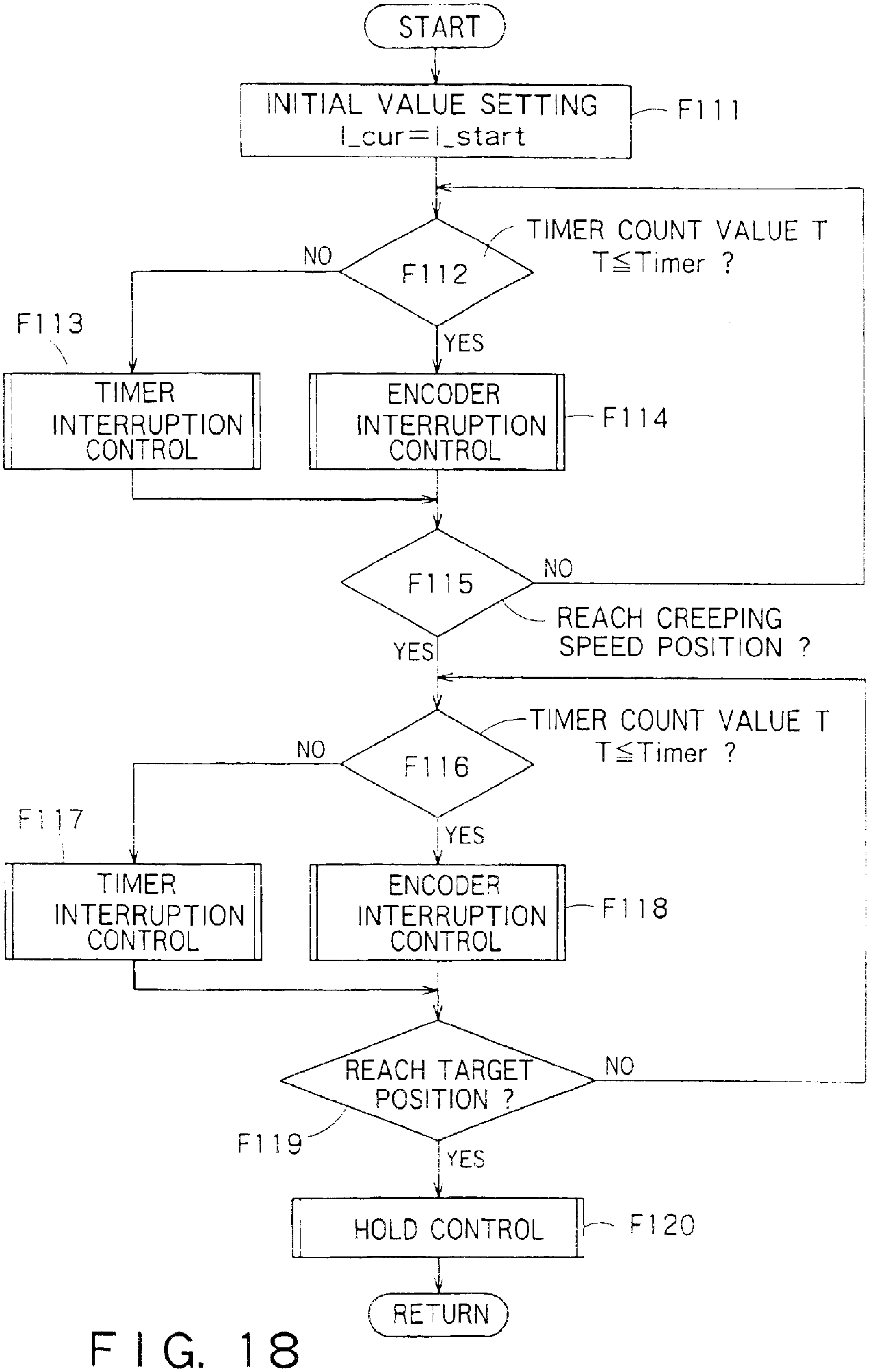
FIG. 18 is a flow chart showing the operation of the second embodiment according to the present invention.

The second embodiment of a print control unit according to the present invention will be disclosed with reference to FIGS. 17 and 18. FIG. 17 is a block diagram showing the construction of the second embodiment of a print control unit according to the present invention. FIG. 18 is a flow chart showing the operation of the second embodiment.

A print control unit 80A in this embodiment is provided with a creeping speed-switching judgement portion 100 in addition to the elements the same as those of the print control unit 80 shown in FIG. 1 as the first embodiment.

The creeping speed-switching judgement portion 100 judges as to whether the carriage 3 has reached a target position based on the output of the position counter 81, and feeds a command signal to the selection control part 84 when the carriage 3 has reached the target position.

On reception of the command signal from the creeping speed-switching judgement portion 100, the selection control part 84 switches a carriage speed from a high or a normal speed to a creeping speed.

In this embodiment, the target speed is the high or the normal speed, when the selection control part 84 has received the start-up command for load-applied positioning control from the CPU 16.

The operation of the second embodiment will be explained withe reference to FIG. 18.

Like the first embodiment, when the selection control part 84 receives the start-up command for load-applied positioning control and also the control parameters from the CPU 16, the timer 84*a* of the selection control part 84 is set at a set value Timer in accordance with the target speed, and also a current value I_cur to be supplied to the CR motor 4 is set at I_start (I_cur=I_start), the set current value being supplied to the CR motor (see step F111 in FIG. 18).

When the timer counter 84*a* has received no pulses from the position counter 81 until a counted value T reaches the set value Timer from the count start-up (it is assumed that T>Timer), the selection control par 84 selects the timer interruption control part 85 for timer interruption control processing (see steps F112 and 113 in FIG. 18). On the other hand, when the counter value T is equal to or smaller than the set value Timer, the selection control par 84 selects the encoder interruption control part 85 for encoder interruption control processing (see steps F112 and 114 in FIG. 18). The operations of the timer and encoder interruption controls are same as those described in the first embodiment.

The creeping speed-switching judgement portion 100 judges at a predetermined timing, as to whether the carriage 3 has reached a predetermined position just before the target position, based on the output of the position counter 81 (see step F115 in FIG. 18). If not reached, the process returns to step F112 and repeats the same steps described above.

When the carriage 3 has reached the predetermined position just before the target position, the creeping speed-switching judgement portion 100 feeds a command signal to the selection control part 84. The selection control part 84 then switches the target speed of the carriage 3 from the high or the normal speed to the creeping speed, and the timer 84*a* of the selection control part 84 is set at the set value Timer, with no change in current value to be supplied to the CR motor 4.

On setting at the set value Timer, the timer 84*a* of the selection control part 84 starts counting.

When the timer counter 84*a* has received no pulses from the position counter 81 until the counted value T reaches the set value Timer from the count start-up (it is assumed that T>Timer), the selection control par 84 selects the timer interruption control part 85 for timer interruption control processing (see steps F116 and 117 in FIG. 18).

On the other hand, when the counter value T is equal to or smaller than the set value Timer, the selection control par 84 selects the encoder interruption control part 85 for encoder interruption control processing (see steps F116 and F118 in FIG. 18).

The control parameters used for the timer and encoder interruption controls are the control parameters for the creeping speed as the target speed. The operations of the timer and encoder interruption controls are same as those described in the first embodiment.

When the timer counter 84*a* receives the pulses from the position counter 81 or the counted value T of the timer counter 84*a* reaches the set value Timer, the selection control part 84 judges as to whether the carriage 3 has reached the target position, or the target range (see step F119 in FIG. 18).

If not reached, the process returns to step F116 to repeats the steps described above. On the other hand, when the carriage 3 has reached the target position, the selection control part 84 selects the hold control part 89 for hold control processing (see step F120 in FIG. 18). The CR motor 4 is then driven based on the current value I_cur decided by the hold control part 89 and fed via the D/A converter 92 and the driver 5.

As disclosed above, the second embodiment according to the present invention achieves carriage transfer and stoppage at the target position even if unexpected load is applied to the carriage, and further time shortening for load-applied positioning control.

In the first and the second embodiments, the object to be controlled is a carriage, however, it can be a sheet of paper fed by a PF motor or an ASF (Auto Sheet Feed) motor, offering the same advantages.

Moreover, the first and the second embodiments use a DC motor, however, the present invention can be applied to printing apparatus installing any other motors.

(Third Preferred Embodiment)

Figure 19:
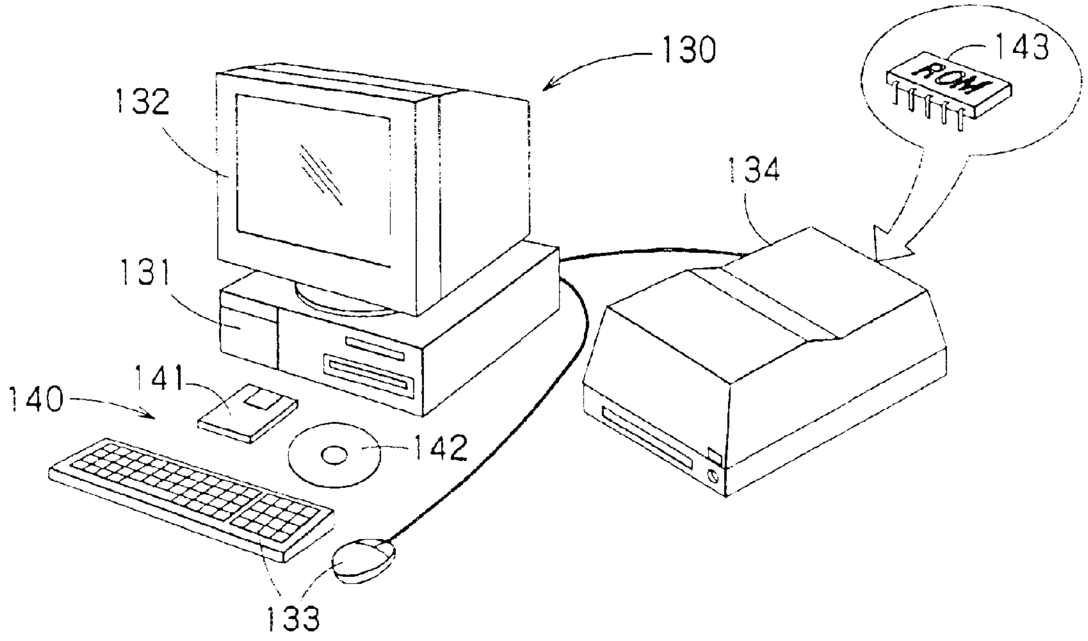
FIG. 19 is a perspective view showing an example of a computer system using a storage medium, in which a print control unit control program has been recorded, according to the present invention.
Figure 20:
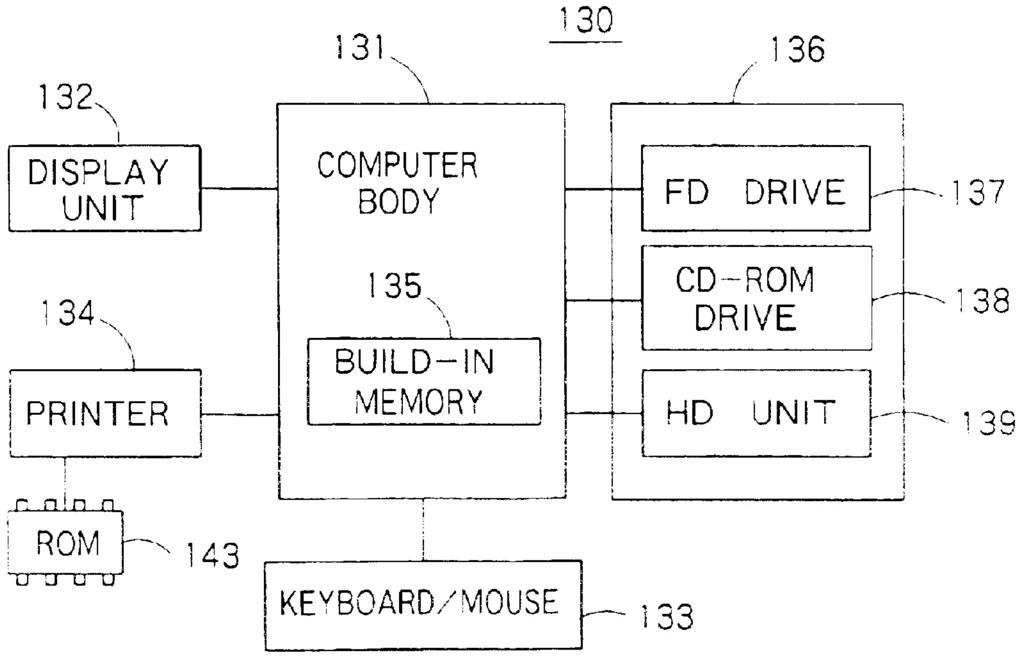
FIG. 20 is a block diagram showing an example of a computer system using a storage medium, in which a print control unit control program has been recorded, according to the present invention.

Referring to FIGS. 19 and 20, the third preferred embodiment of the present invention will be described below. This preferred embodiment relates to a storage medium, in which a control program for controlling a print control unit has been stored. FIGS. 19 and 20 are a perspective view and block diagram showing an example of a computer system 130 which uses a storage medium, in which a print control program in this preferred embodiment has been recorded.

In FIG. 19, the computer system 130 comprises a computer body 130 including a CPU, a display unit 132, such as a CRT, an input unit 133, such as a keyboard or mouse, and a printer 134 for carrying out a print.

As shown in FIG. 20, the computer body 131 comprises an internal memory 135 of a RAM, and a built-in or exterior memory unit 136. As the memory unit 136, a flexible or floppy disk (FD) drive 137, a CD-ROM drive 138 and a hard disk drive (HD) unit 139 are mounted. As shown in FIG. 19, a flexible disk or floppy disk (FD) 141 which is inserted into a slot of the FD drive 137 to be used, a CD-ROM 142 which is used for the CD-ROM drive 138, or the like is used as a storage medium 140 for use in the memory unit 136.

As shown in FIGS. 19 and 20, it is considered that the FD 141 or the CD-ROM 142 is used as the storage medium for use in a typical computer system. However, since this preferred embodiment relates to a control program for controlling a motor for use in the printer 134, the control program of the present invention may be recorded in, e.g., a ROM chip 143 serving as a nonvolatile memory which is built in the printer 134. Of course, the storage medium may be any one of FDs, CD-ROMs, MOs (Magneto-Optical) disks, DVDs (Digital Versatile Disks), other optical recording disks, card memories, and magnetic tapes.

Figure 8:
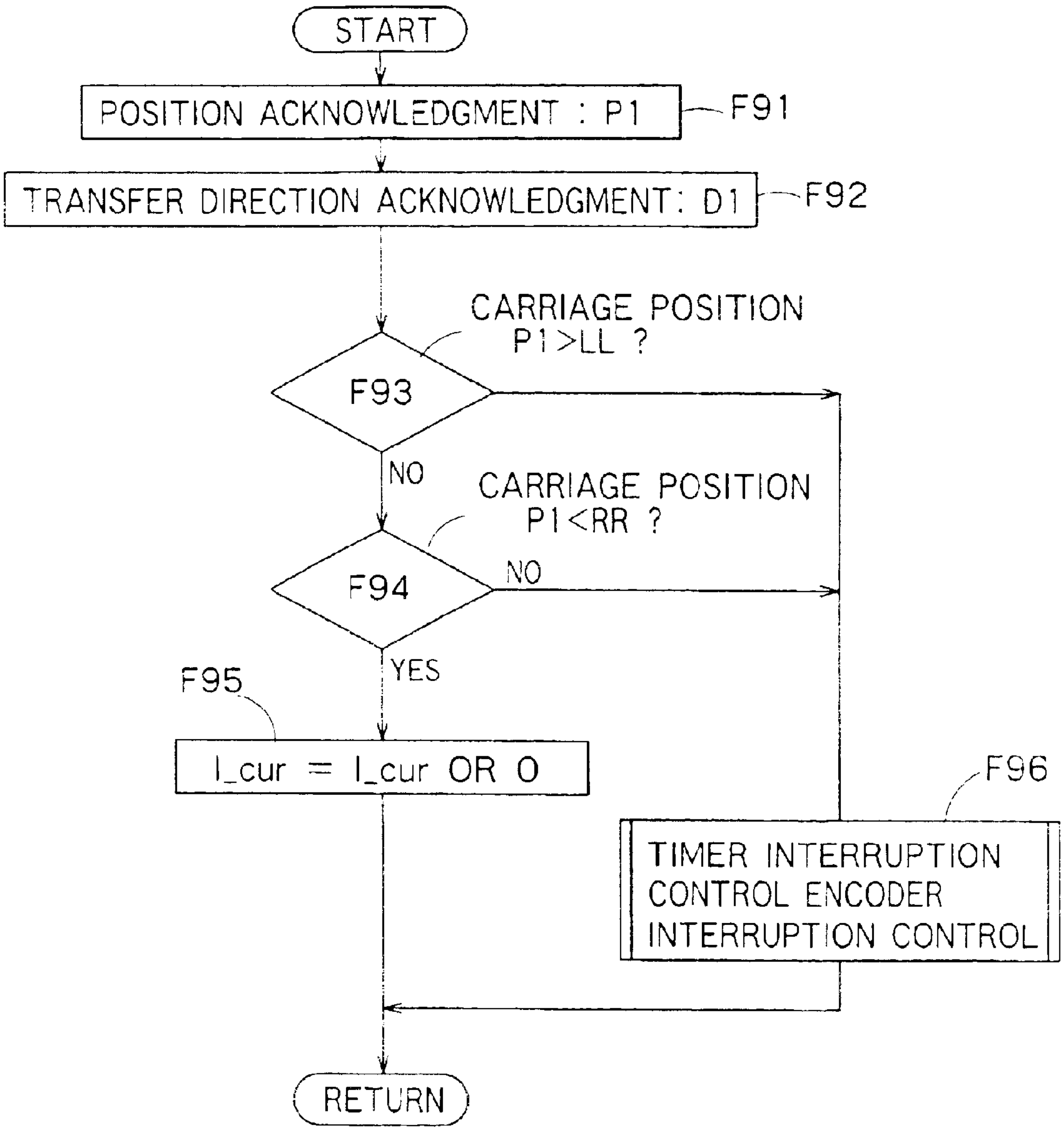
FIG. 8 is a flow chart showing the operation of hold control according to the present invention.

The storage medium 140 in this preferred embodiment is designed to carry out a control procedure including steps F1 through F6 shown in FIG. 2; steps F11 through F21 shown in FIG. 4; steps F31 through F48 shown in FIG. 5; steps F50 through F60 shown in FIG. 6; steps F71 through F83 shown in FIG. 7; steps F91 through F96 shown in FIG. 8; steps F101 through F107 shown in FIG. 16; and steps F111 through F120 shown in FIG. 18.

That is the storage medium 140 in this embodiment may store control program code for controlling a print control unit, including: first program code for supplying an initial current value to a carriage motor for driving a carriage; second program code for comparing a counted value of a position counter and a target position of the carriage when a timer counter receives pulses from the position counter and when the counted value of the timer counter reaches the set value; third program code for performing hold control so that the carriage is stopped within an allowable range including a target range based on the output of the position counter and at least one of control parameters when the position of the carriage is located within the target range including the target position; forth program code for performing timer interruption control so that a speed of the carriage reaches the target speed based on the output of the position counter and the control parameter when the position of the carriage is not located within the target range and when the timer counter receives no pulses from the position counter even the counted value of the timer counter has reached the set value; and fifth program code for performing encoder interruption control so that the speed of the carriage reaches the target speed based on the outputs of the position counter and the period counter and also the control parameter when the position of the carriage is not located within the target range and when the timer counter receives pulses from the position counter until the counted value of the timer counter reaches set value.

As disclosed above, the present invention achieves transfer and stoppage of an object to be controlled at a target position even though unexpected load is applied to the object.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A print control unit comprising:

a position detecting part to detect a position and a transfer direction of an object to be controlled and driven by a motor;

a speed detecting part to detect at least a physical value that corresponds to a speed of the object;

a first control part to decide a current value to be supplied to the motor so that the speed of the object reaches a target speed, based on the output of the position detecting part and at least one of control parameters, thus controlling the motor based on the current value decided by the first control part;

a second control part to decide the current value to be supplied to the motor so that the speed of the object reaches the target speed, based on the outputs of the position detecting part and the speed detecting part, and at least one of the control parameters, thus controlling the motor based on the current value decided by the second control part;

a third control part to decide the current value to be supplied to the motor so that the object stops within a predetermined range, based on the output of the position detecting part and at least one of the control parameters, thus controlling the motor based on the decided current value; and a selection control part, operating at a predetermined timing, to select and set the control parameters in accordance with the target speed, to judge as to whether the object is located within a target range, based on the output of the position detecting part, if located, the selection control part selecting and operating the third control part, while if the object is not located within the target range, the selection control part selecting and operating the first or the second control part based on the physical value corresponding to the speed.

2. A print control unit, as set forth in claim 1, further comprising a differential speed control part, operating when the first or the second control part is selected, to calculate speeds of the object based on the output of the speed detecting part for obtaining speed deviations of the speeds of the object at operations from a reference speed, to calculate a current value that is proportional to the difference between the speed deviation at the present operation and the speed deviation at a previous operation, thus controlling the motor based on addition of the calculated current value and the output of the selected control part.

3. A print control unit, as set forth in claim 1, wherein the object to be controlled is a carriage, the motor is a carriage motor for driving the carriage, and the position detecting part comprises a counter that detects leading and trailing edges of output pulses of an encoder that generates the pulses according to rotation of the carriage motor, counts up the detected edges when the carriage motor is rotating in a normal direction, while counts down the detected edges when the carriage motor is rotating in the reverse direction, the position detecting part generating pulses in synchronism with the leading and trailing edges.

4. A print control unit, as set forth in claim 3, wherein the selection control part comprises a timer counter, having a set value in accordance with the target speed of the carriage, whose counted value is reset when the counted value reaches the set value or when the timer counter receives the pulses from the position detecting part, and, when the carriage is not located within the target range, the selection control part selects the first control part when receiving no pulses from the position detecting part even when the counted value of the timer counter has reached the set value, while selects the second control part when receiving the pulses from the position detecting part before the counted value of the timer counter reaches the set value.

5. A print control unit, as set forth in claim 4, wherein when the first control part is selected by the selection control part, and when the position of the carriage is not located beyond the target position, the first control part adds an incremental or a decremental current value selected among the control parameters according to the target speed to a current value that is now being supplied to the carriage motor, thus controlling the carriage motor based on the addition result, when the position of the carriage is located beyond the target position and also the target range, the first control part subtracts the incremental or the decremental current value from the current value that is now being supplied to the carriage motor, thus controlling the carriage motor based on the subtraction result, and when the position of the carriage is located within the target range, the first control part subtracts a current value corresponding to friction load that is one of the control parameters from the current value being supplied to the carriage motor in a direction that is the reverse of a direction in which a current value is supplied to the carriage motor while the carriage is moving, thus controlling the carriage motor based on the subtraction result.

6. A print control unit, as set forth in claim 4, wherein when the second control part is selected by the selection control part, or when the position of the carriage is not located beyond the target position or the position of the carriage is located beyond the target position and the target range, the second control part compares the output of the speed detecting part and a threshold value among the control parameters to select an incremental or a decremental current value among the control parameters, to calculate a current value to be supplied to the carriage motor so that the speed of the carriage reaches the target speed based on the selected incremental or decremental current value and a current value that is now being supplied to the carriage motor, thus controlling the carriage motor based on the calculated current value, while when the position of the carriage is located within the target range, the second control part subtracts a current value corresponding to friction load from the current value supplied to the carriage motor in a direction that is the reverse of a direction in which a current value is being supplied to the carriage motor while the carriage is moving.

7. A print control unit, as set forth in claim 6, wherein the speed detecting part comprises a time measuring part that detects the leading and trailing edges of the output pulses of the encoder and measures a period between the edges, the speed detecting part outputting the measuring result.

8. A print control unit, as set forth in claim 7, further comprising a differential speed control part, operating while the first or the second control part has been selected, to calculate speeds of the object based on the output of the speed detecting part to obtain speed deviations of the speeds of the object at operations from a reference speed, to calculate a current value that is proportional to the difference between the speed deviation at the present operation and the speed deviation at a previous operation, thus controlling the motor based on addition of the calculated current value and the output of the selected control part.

9. A print control unit, as set forth in claim 4, wherein when the third control part is selected by the selection control part, the third control part judges as to whether the position of the carriage is located within a predetermined allowable range including the target range, if located, to set the current value to be supplied to the carriage motor at zero for controlling the carriage motor, while if not located within the allowable range, to operate the first or the second control part via the selection control part.

10. A print control unit, as set forth in claim 3, wherein when an absolute value of the current value to be supplied to the carriage motor exceeds an allowable value, the carriage is stopped for short brake operation of the carriage motor.

11. A print control unit, as set forth in claim 3, wherein, based on the output of the position detecting part, while the carriage is approaching a predetermined position towards the target range, the predetermined position being located outside the target range and being apart from one of terminals of the target range by a predetermined distance, the selection control part selects and sets at least one of the control parameters so that the target speed of the carriage reaches a first value, and when the carriage passes the predetermined position, the selection control part selects and sets at least one of the control parameters so that the target speed reaches a second value that is smaller than the first value.

12. A print control method used for a print control unit comprising a position counter having a counter that detects leading and trailing edges of output pulses of an encoder that is transferred with a carriage driven by a carriage motor, and counts up the detected edges while the carriage motor is rotating in a normal direction, and counts down the detected edges while the carriage motor is rotating in a reverse direction, thus the position counter generating pulses in synchronism with the leading and trailing edges; a period counter to detect the leading and trailing edges of the output pulses of the encoder, and measure a period between the edges; and a timer counter having a set value corresponding to a target speed of the carriage, a counted value of the timer counter being reset when the counted value has reached the set value or when the timer counter receives the pulses from the position counter, the method comprising:

supplying an initial current value to the carriage motor;

comparing the counted value of the position counter and a target position of the carriage when the timer counter receives the pulses from the position counter or when the counted value of the timer counter reaches the set value;

performing hold control so that the carriage is stopped within an allowable range comprising a target range based on the output of the position counter and at least one of control parameters when the position of the carriage is located within the target range comprising the target position;

performing timer interruption control so that a speed of the carriage reaches the target speed based on the output of the position counter and the control parameter when the position of the carriage is not located within the target range and when the timer counter receives no pulses from the position counter even when the counted value of the timer counter has reached the set value; and performing encoder interruption control so that the speed of the carriage reaches the target speed based on the outputs of the position counter and the period counter and also the control parameter when the position of the carriage is not located within the target range and when the timer counter receives pulses from the position counter until the counted value of the timer counter reaches the set value.

13. A print control method, as set forth in claim 12, wherein the performing timer interruption control comprises:

when the position of the carriage is not located beyond the target position, adding an incremental or a decremental current value selected among the control parameters based on the target speed, to a current value that is now being supplied to the carriage motor, thus controlling the carriage motor based on the addition result;

when the position of the carriage is located beyond the target position and the target range, subtracting the incremental or decremental current value from the current value that is now being supplied to the carriage motor, thus controlling the carriage motor based on the subtraction result; and when the position of the carriage is located within the target range, subtracting a current value corresponding to friction load that is one of the control parameters from the current value supplied to the carriage motor in a direction that is the reverse of a direction in which a current value is supplied to the carriage motor while the carriage is moving, thus controlling the carriage motor based on the subtraction result.

14. A print control method, as set forth in claim 12, wherein the performing encoder interruption control comprises:

when the position of the carriage is not located beyond the target position or the position of the carriage is located beyond the target position and the target range, comparing output of the period counter and a threshold value among the control parameters to select an incremental or a decremental current value among the control parameters based on the comparison result, to calculate a current value to be supplied to the carriage motor so that the speed of the carriage reaches the target speed based on the selected incremental or decremental current value and the current value that is now being supplied to the carriage motor, thus controlling the carriage motor based on the calculated current value; and when the position of the carriage is located within the target range, subtracting a current value corresponding to friction load from the current value supplied to the carriage motor in a direction that is the reverse of a direction in which a current value is supplied to the carriage motor while the carriage is moving, thus controlling the carriage motor based on the subtraction result.

15. A print control method, as set forth in claim 12, wherein the performing hold control comprises judging as to whether the position of the carriage is located in a predetermined allowable range comprising the target range, if located, to set the current value to be supplied to the carriage motor at zero for controlling the carriage motor, while if not located, to perform the timer interruption control or the encoder interruption control.

16. A computer-readable storage medium storing control program code for controlling a print control unit, comprising:

first program code means for supplying an initial current value to a carriage motor for driving a carriage;

second program code means for comparing a counted value of a position counter and a target position of the carriage when a timer counter receives pulses from the position counter or when the counted value of the timer counter reaches a set value;

third program, code means for performing hold control so that the carriage is stopped within an allowable range comprising a target range based on the output of the position counter and at least one of control parameters when the position of the carriage is located within the target range comprising the target position;

fourth program code means for performing timer interruption control so that a speed of the carriage reaches a target speed based on the output of the position counter and the control parameter when the position of the carriage is not located within the target range and when the timer counter receives no pulses from the position counter even when the counted value of the timer counter has reached the set value; and fifth program code means for performing encoder interruption control so that the speed of the carriage reaches the target speed based on the outputs of the position counter and the period counter and also the control parameter when the position of the carriage is not located within the target range and when the timer counter receives pulses from the position counter until the counted value of the timer counter reaches the set value.

17. A print control unit comprising:

a position detecting part to detect a position and a transfer direction of an object to be controlled and driven by a motor;

a speed detecting part to detect at least a physical value that corresponds to a speed of the object;

a first control part to decide an input value to be supplied to the motor so that the speed of the object reaches a target speed, based on the output of the position detecting part, thus controlling the motor based on the input value decided by the first control part;

a second control part to decide the input value to be supplied to the motor so that the speed of the object reaches the target speed, based on the outputs of the position detecting part and the speed detecting part, thus controlling the motor based on the input value decided by the second control part;

a third control part to decide the input value to be supplied to the motor so that the object stops within a predetermined range, based on the output of the position detecting part, thus controlling the motor based on the decided input value; and a selection control part, operating at a predetermined timing, to judge as to whether the object is located within a target range, based on the output of the position detecting part, if located, the selection control part selecting and operating the third control part, while if the object is not located within the target range, the selection control part selecting and operating the first or the second control part based on the physical value corresponding to the speed.

18. A print control method used for a print control unit comprising a position counter having a counter that detects leading and trailing edges of output pulses of an encoder that is transferred with a carriage driven by a carriage motor, and counts up the detected edges while the carriage motor is rotating in a normal direction, and counts down the detected edges while the carriage motor is rotating in a reverse direction, thus the position counter generating pulses in synchronism with the leading and trailing edges; a period counter to detect the leading and trailing edges of the output pulses of the encoder, and measure a period between the edges; and a tinier counter having a set value corresponding to a target speed of the carriage, a counted value of the timer counter being reset when the counted value has reached the set value or when the timer counter receives the pulses from the position counter, the method comprising:

supplying an initial input value to the carriage motor;

comparing the counted value of the position counter and a target position of the carriage when the timer counter receives the pulses from the position counter or when the counted value of the timer counter reaches the set value;

performing hold control so that the carriage is stopped within an allowable range comprising a target range based on the output of the position counter when the position of the carriage is located within the target range comprising the target position;

performing timer interruption control so that a speed of the carriage reaches the target speed based on the output of the position counter parameter when the position of the carriage is not located within the target range and when the timer counter receives no pulses from the position counter even when the counted value of the timer counter has reached the set value; and performing encoder interruption control so that the speed of the carriage reaches the target speed based on the outputs of the position counter and the period counter when the position of the carriage is not located within the target range and when the timer counter receives pulses from the position counter until the counted value of the timer counter reaches the set value.

19. A computer-readable storage medium storing control program code for controlling a print control unit, comprising:

first program code means for supplying an initial input value to a carriage motor for driving a carriage;

second program code means for comparing a counted value of a position counter and a target position of the carriage when a timer counter receives pulses from the position counter or when the counted value of the timer counter reaches a set value;

third program code means for performing hold control so that the carriage is stopped within an allowable range comprising a target range based on the output of the position counter when the position of the carriage is located within the target range comprising the target position;

fourth program code means for performing timer interruption control so that a speed of the carriage reaches a target speed based on the output of the position counter when the position of the carriage is not located within the target range and when the timer counter receives no pulses from the position counter even when the counted value of the timer counter has reached the set value; and fifth program code means for performing encoder interruption control so that the speed of the carriage reaches the target speed based on the outputs of the position counter and the period counter when the position of the carriage is not located within the target range and when the timer counter receives pulses from the position counter until the counted value of the timer counter reaches the set value.

* * * * *